US010926687B2

(12) United States Patent
Tadros et al.

(10) Patent No.: US 10,926,687 B2
(45) Date of Patent: Feb. 23, 2021

(54) MOBILE SHOWROOM

(71) Applicant: Interactive Mobile Marketing, LLC, Grapevine, TX (US)

(72) Inventors: George Tadros, Southlake, TX (US); Ehab Sweis, Southlake, TX (US)

(73) Assignee: INTERACTIVE MOBILE MARKETING, LLC, Grapevine, TX (US)

( * ) Notice: Subject to any disclaimer, the term of this patent is extended or adjusted under 35 U.S.C. 154(b) by 123 days.

(21) Appl. No.: 16/402,572

(22) Filed: May 3, 2019

(65) Prior Publication Data

US 2019/0337439 A1 Nov. 7, 2019

Related U.S. Application Data

(60) Provisional application No. 62/742,697, filed on Oct. 8, 2018, provisional application No. 62/666,540, filed on May 3, 2018.

(51) Int. Cl.
*B60R 13/00* (2006.01)
*B60P 3/025* (2006.01)
(Continued)

(52) U.S. Cl.
CPC ........ *B60P 3/0255* (2013.01); *B60R 11/0235* (2013.01); *B60R 16/03* (2013.01); *G09F 21/048* (2013.01)

(58) Field of Classification Search
CPC .. G06Q 30/02; G06Q 30/0601; G06Q 50/184; G06Q 10/10; G06F 16/93;
(Continued)

(56) References Cited

U.S. PATENT DOCUMENTS 676,822 A * 6/1901 Neumayer .............. G09F 21/04
40/590
4,128,268 A * 12/1978 Sundlof .................... B60P 3/42
296/10
(Continued)

FOREIGN PATENT DOCUMENTS

DE 20316588 4/2005
FR 1237903 6/1960
(Continued)

OTHER PUBLICATIONS

Rossi et al., U.S. Appl. No. 16/017,067, filed Jun. 25, 2018.

*Primary Examiner* — Kiran B Patel
(74) *Attorney, Agent, or Firm* — Haynes and Boone, LLP

(57) ABSTRACT

A system includes a vehicle, a rear display assembly, and a center display assembly. The rear display assembly extends within a main rear storage compartment of the vehicle. The rear display assembly comprises a first base movable in opposing directions between retracted and deployed configurations and a first merchandising module supported by the first base and usable when the first base is in the deployed configuration to demonstrate and/or display a first device. The center display assembly extends within a main center cabin of the vehicle. The center display assembly comprises a second base and a first display module supported by the second base. A first power source is operable to provide electrical power to the first device and/or the first display module. A second power source is operable to provide electrical power to the vehicle. The first and second power sources are separate.

20 Claims, 18 Drawing Sheets

(51) Int. Cl.
*G09F 21/04* (2006.01)
*B60R 16/03* (2006.01)
*B60R 11/02* (2006.01)

(58) Field of Classification Search
CPC .................. G06F 3/011; G06F 3/0412; G09G 2320/0209; G09G 2320/0247; G09G 3/3622
See application file for complete search history.

(56) References Cited

U.S. PATENT DOCUMENTS

| | | | |
|---|---|---|---|
| 4,701,627 A * | 10/1987 | Gambuti | G09F 27/00 296/21 |
| 5,108,122 A | 4/1992 | Beagley | |
| 5,238,281 A * | 8/1993 | Chen | B60R 13/00 296/21 |
| 5,310,209 A * | 5/1994 | Holman | B60P 3/0255 280/43.1 |
| 5,709,454 A * | 1/1998 | Hatlestad, II | B60Q 1/30 362/496 |
| 7,175,321 B1 * | 2/2007 | Lopez | B60Q 1/50 296/21 |
| D551,128 S * | 9/2007 | Renard | D12/102 |
| 7,364,050 B2 | 4/2008 | Guard | |
| 7,942,461 B2 | 5/2011 | Cohen et al. | |
| 8,063,998 B2 * | 11/2011 | Smith | H04N 7/183 296/21 |
| D652,353 S | 1/2012 | Cohen et al. | |
| D653,993 S | 2/2012 | Cohen et al. | |
| 8,188,845 B2 * | 5/2012 | Abernethy, Jr. | G09F 9/30 296/21 |
| 8,220,854 B2 | 7/2012 | Cohen et al. | |
| D678,823 S | 3/2013 | Cohen et al. | |
| 8,690,215 B2 | 4/2014 | Cohen et al. | |
| D736,675 S | 8/2015 | Cohen et al. | |
| 9,481,283 B2 | 11/2016 | Cohen et al. | |
| D782,938 S | 4/2017 | Cohen et al. | |
| 9,868,380 B2 * | 1/2018 | Peterson | B60P 3/0255 |
| 10,005,382 B1 * | 6/2018 | Rossi | A47F 5/10 |
| D824,322 S | 7/2018 | Rossi et al. | |
| 10,269,273 B1 * | 4/2019 | Borden | E04B 1/3442 |
| 10,394,112 B2 * | 8/2019 | Johnson | G03B 29/00 |
| 2003/0178867 A1 * | 9/2003 | Buring et al. | B60R 13/00 296/21 |
| 2003/0178868 A1 | 9/2003 | Lapsley | |
| 2004/0027001 A1 * | 2/2004 | Reed, III | B60P 3/0257 307/10.1 |
| 2004/0256872 A1 * | 12/2004 | Piper | B60P 3/0257 296/24.36 |
| 2007/0182181 A1 | 8/2007 | Cohen et al. | |
| 2010/0023372 A1 | 1/2010 | Gonzalez | |
| 2010/0032975 A1 * | 2/2010 | Cohen | G09F 21/04 296/21 |
| 2013/0099519 A1 * | 4/2013 | Cohen | B62D 25/02 296/21 |
| 2015/0015016 A1 | 1/2015 | Cohen et al. | |
| 2015/0197194 A1 * | 7/2015 | Salter | B60Q 3/68 362/510 |
| 2017/0297502 A1 * | 10/2017 | Kim | B60R 11/00 |
| 2018/0111539 A1 * | 4/2018 | Cohen | B62D 61/06 |

FOREIGN PATENT DOCUMENTS

| | | |
|---|---|---|
| GB | 2171365 | 8/1986 |
| GB | 2436435 | 9/2007 |
| KR | 20030016775 | 3/2003 |
| WO | WO01/91622 | 12/2001 |

* cited by examiner

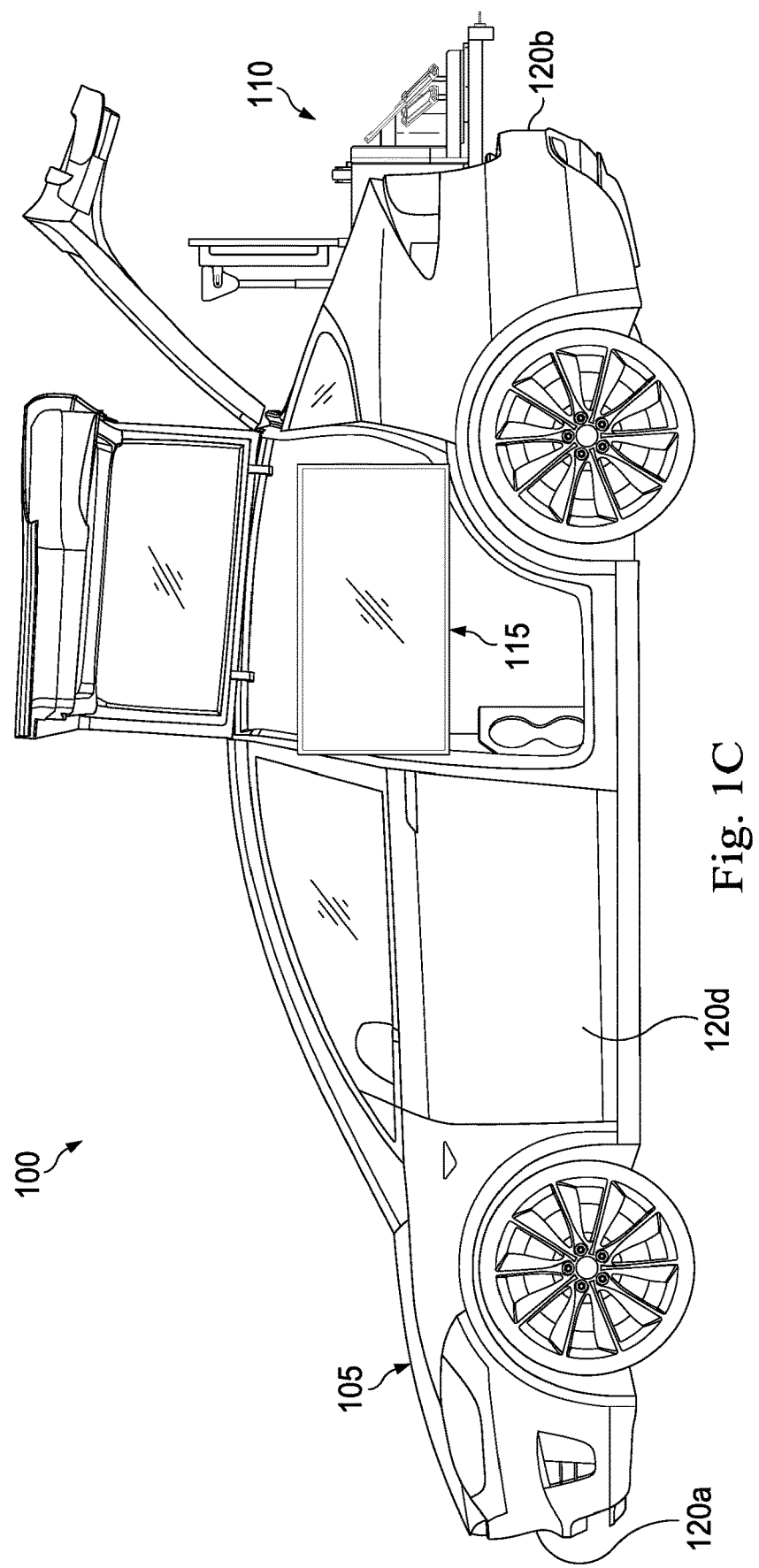

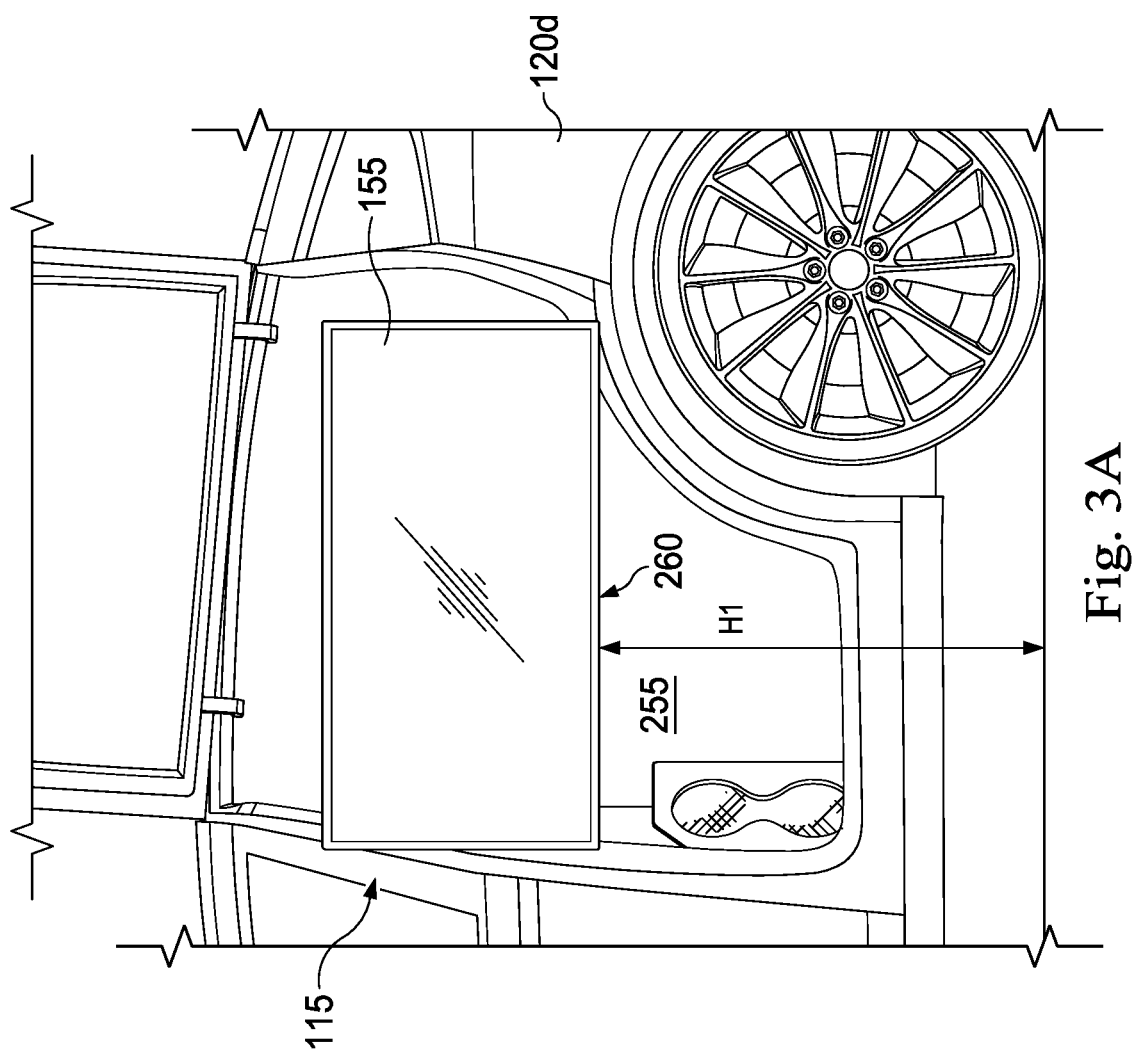

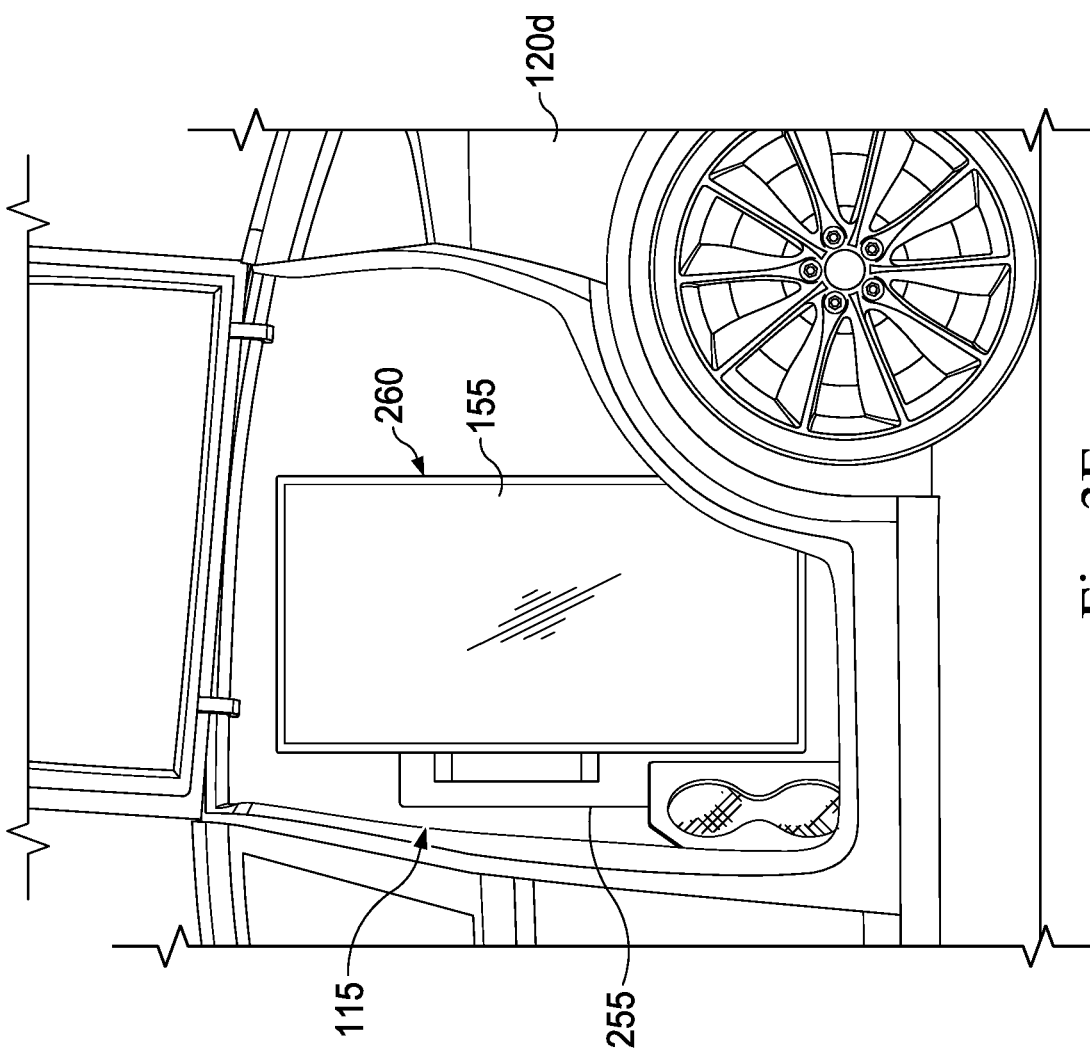

MOBILE SHOWROOM

CROSS-REFERENCE TO RELATED APPLICATIONS

This application claims the benefit of the filing date of, and priority to, U.S. Application No. 62/666,540, filed May 3, 2018, the entire disclosure of which is hereby incorporated herein by reference.

This application also claims the benefit of the filing date of, and priority to, U.S. Application No. 62/742,697, filed Oct. 8, 2018, the entire disclosure of which is hereby incorporated herein by reference.

BACKGROUND

This application relates generally to vehicle systems such as, for example, vehicle systems for product merchandising; in several embodiments, the systems are mobile showrooms.

BRIEF DESCRIPTION OF THE DRAWINGS

FIG. 1C is a side elevational view of the mobile showroom of FIG. 1A, according to one or more embodiments of the present disclosure.

FIG. 3A is a side elevational view of a center display assembly of the mobile showroom of FIG. 1C in a first deployed state or configuration, according to one or more embodiments of the present disclosure.

FIG. 3E is a side elevational view of the center display assembly of FIG. 3D, according to one or more embodiments of the present disclosure.

DETAILED DESCRIPTION

Figure 1A:
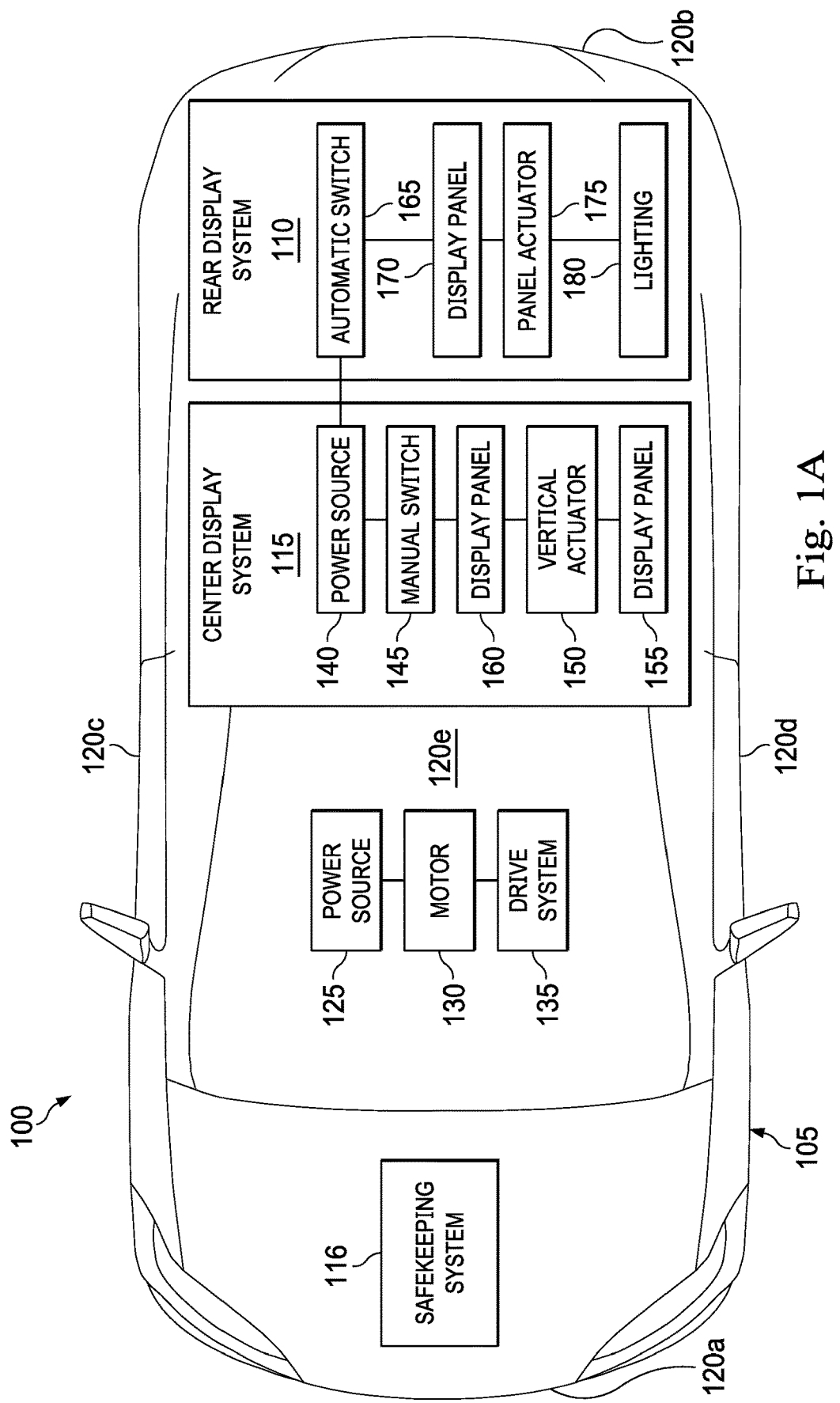
FIG. 1A is a diagrammatic illustration of a mobile showroom, according to one or more embodiments of the present disclosure.

In an embodiment, as illustrated in FIGS. 1A, a vehicle system such as, for example, a mobile showroom, is diagrammatically illustrated and generally referred to by the reference numeral 100. The mobile showroom 100 includes a vehicle 105, such as a van or an SUV, a rear display assembly 110, a center display assembly 115, and a safekeeping assembly 116. In some embodiments, the vehicle 105 is a Tesla Model X; alternatively, any other brand or model of vehicle may be used as part of the mobile showroom 100. For example, the vehicle 105 may be an electric vehicle or a fuel cell electric vehicle. The vehicle 105 may include a front portion 120a (including a front bumper, a hood, and a front storage trunk), a rear portion 120b (including a rear bumper and a main rear storage compartment), a right side portion 120c (including a right front quarter panel, a right front door, a right rear door, and a right rear quarter panel), a left side portion 120d (including a left front quarter panel, a left front door, a left rear door, and a left rear quarter panel), and a top portion 120e (including a roof). Moreover, as shown in FIG. 1A, the vehicle 105 includes, among other components, a power source 125, such as a battery, a motor 130, and a drive system 135. The motor 130 may be an electric motor powered by the power source 125.

The center display assembly 115 includes a power source 140, such as a battery, a manual switch 145, a vertical actuator 150, and display panels 155 and 160. The rear display assembly 110 includes an automatic switch 165, a display panel 170, a panel actuator 175, and lighting 180 (e.g., integrated RGB multi-colored LED light strips). In addition to, or instead of, the power source 140 being incorporated into the center display assembly 115, the power source 140 (or another power source) may be incorporated into the rear display assembly 110. The safekeeping assembly 116 is configured to keep and protect, for example, mobile phones and tablet computers during transit.

Figure 1B:
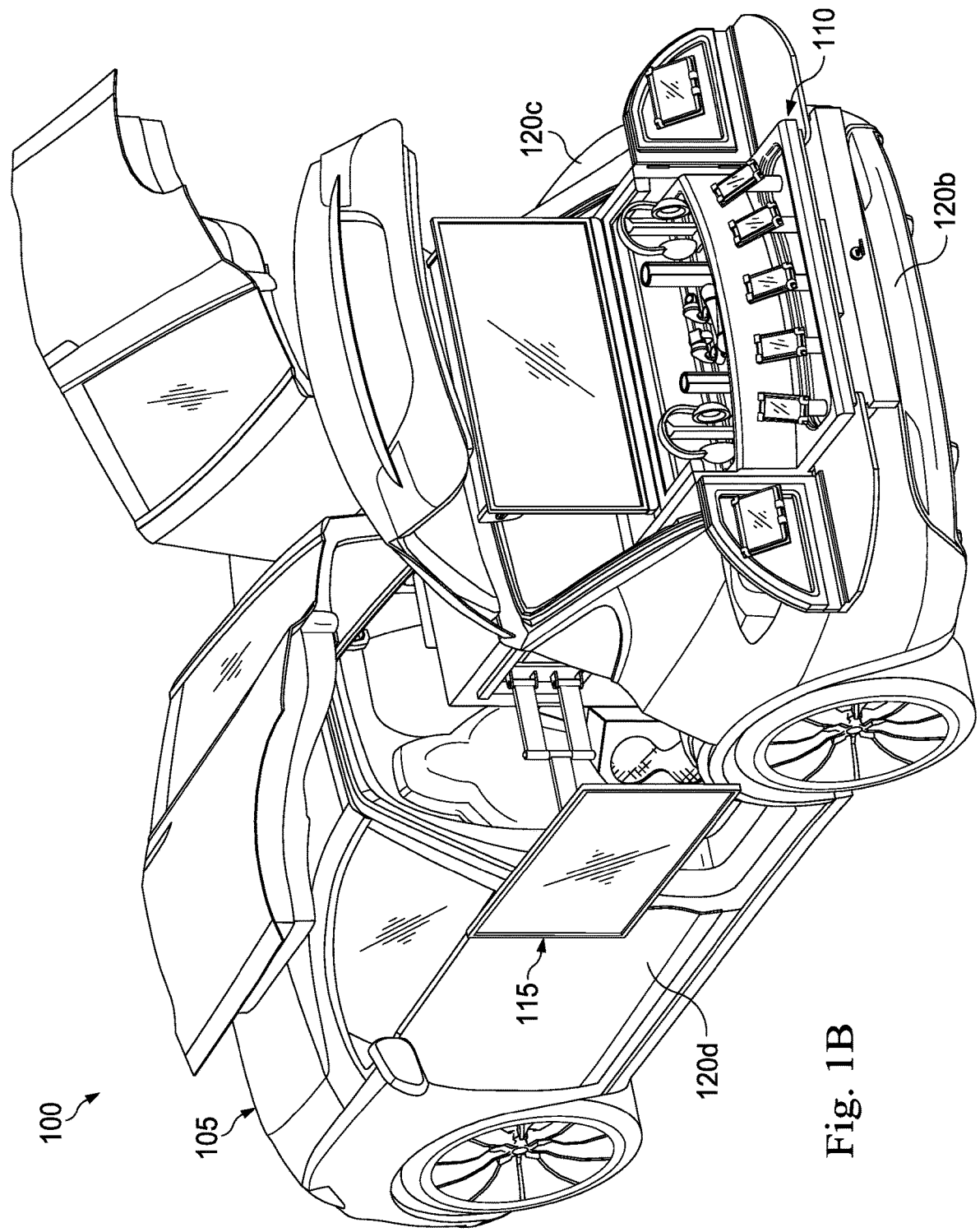
FIG. 1B is a rear perspective view of the mobile showroom of FIG. 1A, according to one or more embodiments of the present disclosure.

In some embodiments, as in FIGS. 1B and 1C, the rear display assembly 110 is positioned in the main rear storage compartment located at the rear portion 120b of the vehicle 105. The vehicle 105 may have a "hatchback" body style to more readily accommodate the rear display assembly 110 within the main rear storage compartment of the vehicle 105. Likewise, in some embodiments, as in FIGS. 1B and 1C, the center display assembly 115 is positioned in the main center cabin of the vehicle 105 (i.e., in front of the main rear storage compartment but behind the driver and front passenger seats). The rear seats of the vehicle 105 may be omitted or removed in order to accommodate the center display assembly 115 behind the driver and front passenger seats in the main center cabin of the vehicle 105. The safekeeping assembly 116 extends within the front storage trunk at the front portion 120a of the vehicle 105. Alternatively, the safekeeping assembly 116 may be mounted to the vehicle 105 at some other location.

Figure 2A:
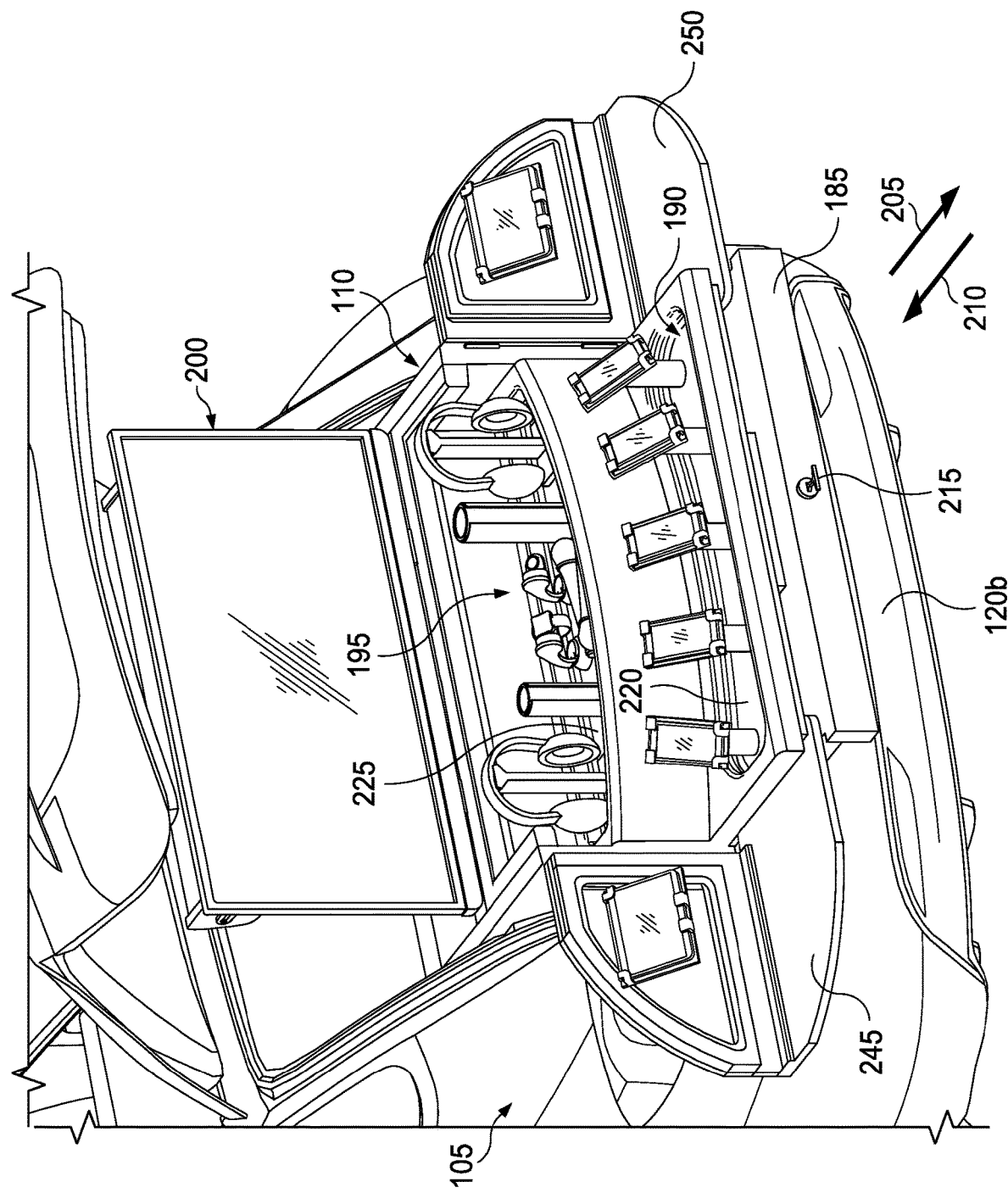
FIG. 2A is a rear perspective view of a rear display assembly of the mobile showroom of FIG. 1B in a deployed state or configuration, according to one or more embodiments of the present disclosure.

In an embodiment, as illustrated in FIG. 2A with continuing reference to FIGS. 1A-1C, the rear display assembly 110 includes a base 185, a lower merchandising module 190, an upper merchandising module 195, and a display module 200. The base 185 is coupled to the vehicle 105 at the rear portion 120b (i.e., in the main rear storage compartment) and is configured to move or slide in opposing directions 205 and 210 relative to the vehicle 105. In some embodiments, the base 185 is a sliding dual latching track system that is secured to the vehicle 105 at the rear portion 120b. In some embodiments, the base 185 is reinforced with steel. In some embodiments, the base 185 includes a latching device 215 that enables the rear display assembly 110 to be stored in a deployed configuration during use and a locked down configuration during transit.

Figure 2B:
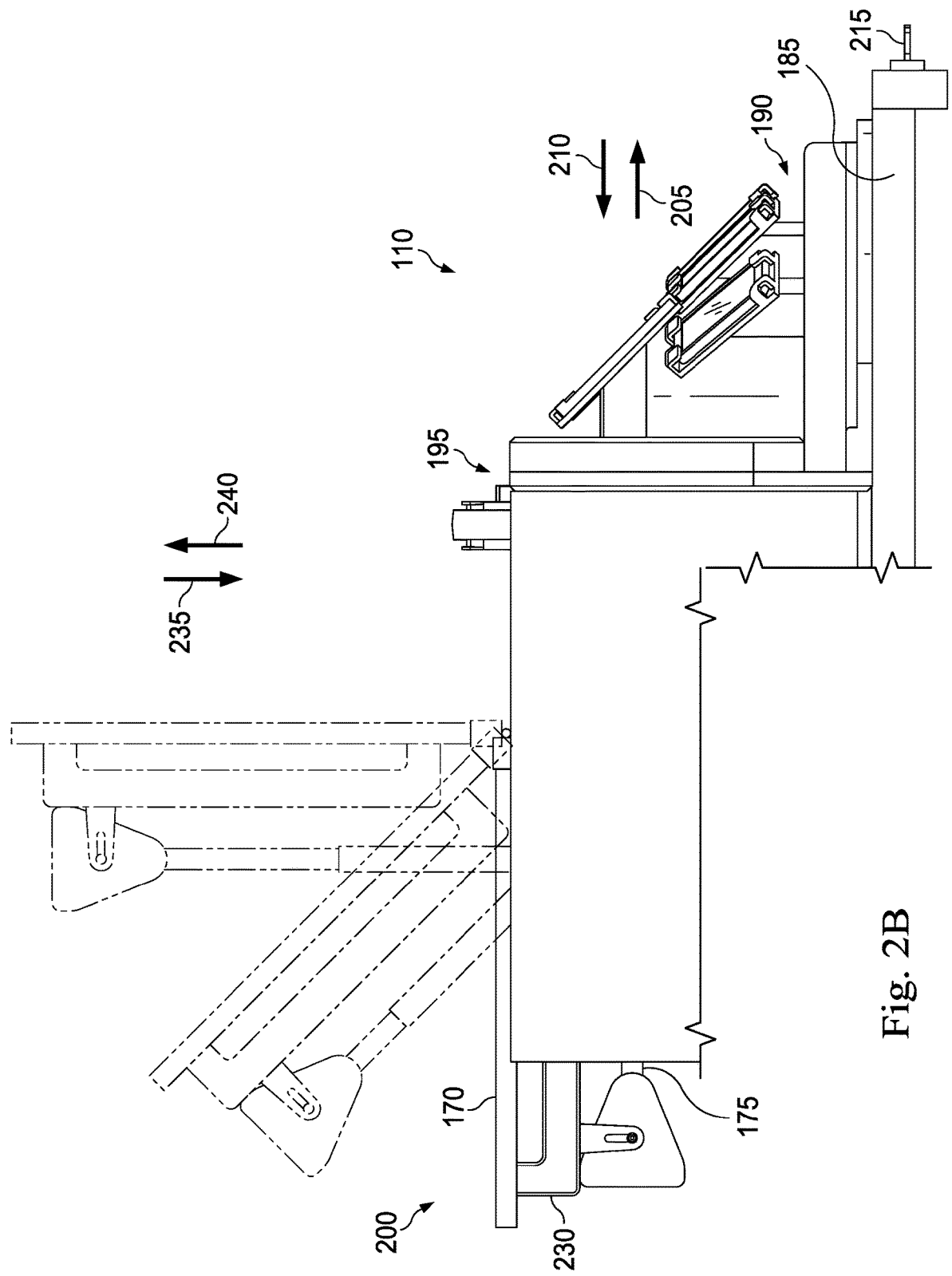
FIG. 2B is a side elevational view of the rear display assembly of FIG. 2A in a first partially-retracted state or configuration, according to one or more embodiments of the present disclosure.
Figure 2C:
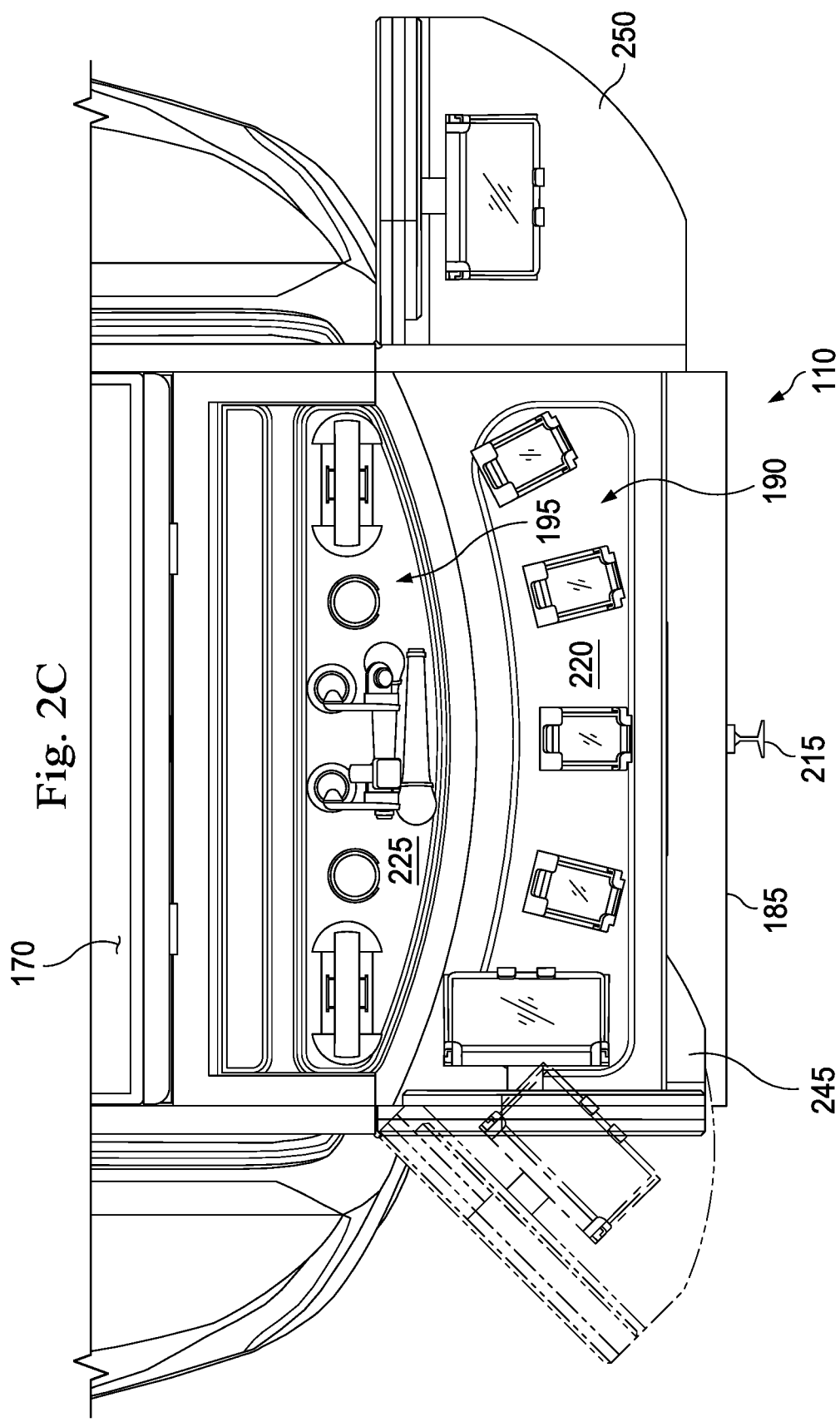
FIG. 2C is a top plan view of the rear display assembly of FIG. 2A in a second partially-retracted state or configuration, according to one or more embodiments of the present disclosure.

The lower merchandising module 190 is coupled to the base 185 and is configured to move or slide in the opposing directions 205 and 210 relative to the vehicle 105. In addition, the lower merchandising module 190 may be configured to move or slide in the opposing directions 205 and 210 relative to the base 185. The lower merchandising module 190 includes a lower merchandising compartment 220. Moving or sliding the lower merchandising module 190 relative to the vehicle 105 and/or the base 185 may at least partially expose or reveal the lower merchandising compartment 220. At least the lower merchandising compartment 220 of the lower merchandising module 190 may be used to demonstrate and display mobile phones, as shown in FIGS. 2A-2C. In addition, or instead, the lower merchandising compartment 220 may be used to demonstrate and display tablet computers. In some embodiments, the lower merchandising module 190 includes at least a portion of the lighting 180 (shown in FIG. 1A) (e.g., integrated RGB multi-colored LED light strips); said portion of the lighting 180 may be controlled by the automatic switch 165, a blue-tooth mobile application, a separate controller, or any combination thereof.

The upper merchandising module 195 is coupled to the base 185 proximate the lower merchandising module 190 and is configured to move or slide in the opposing directions 205 and 210 relative to the vehicle 105. The upper merchandising module 195 may be coupled to the base 185 via the lower merchandising module 190. In addition, the upper merchandising module 195 may be configured to move or slide in the opposing directions 205 and 210 relative to the base 185 and/or the lower merchandising module 190. The upper merchandising module 195 includes an upper merchandising compartment 225. Moving or sliding the upper merchandising module 195 relative to the vehicle 105, the base 185, and/or the lower merchandising module 190 may at least partially expose or reveal the lower merchandising compartment 220 and/or the upper merchandising compartment 225. At least the upper merchandising compartment 225 of the upper merchandising module 195 may be used to demonstrate and display mobile phone accessories, as shown in FIGS. 2A-2C. In addition, or instead, the upper merchandising compartment 225 of the upper merchandising module 195 may be used to demonstrate and display tablet computer accessories. In some embodiments, the upper merchandising module 195 includes at least a portion of the lighting 180 (shown in FIG. 1A) (e.g., integrated RGB multi-colored LED light strips); said portion of the lighting 180 may be controlled by the automatic switch 165, a blue-tooth mobile application, a separate controller, or any combination thereof.

Referring to FIG. 2B, the vehicle 105 is omitted from view to more clearly illustrate the display module 200, which is coupled to the base 185 proximate the upper merchandising module 195 and includes the display panel 170 and the panel actuator 175 (also shown in FIG. 1A). The display module 200 may be coupled to the base 185 via the upper merchandising module 195. For example, the display module 200 may be pivotably coupled to the upper merchandising module 195. In addition, or instead, the display module 200 may be slidably coupled to the upper merchandising module 195. The display module 200 is actuable via the panel actuator 175 between a deployed configuration, in which the display panel 170 extends in a generally non-horizontal orientation, and a retracted configuration, in which the display panel 170 extends in a generally horizontal orientation. In some embodiments, in the deployed configuration, the display panel 170 extends in a generally vertical orientation. Alternatively, in the deployed configuration, the display panel 170 may extend in between a generally vertical orientation and a generally horizontal orientation.

The display module 200 includes a panel mount 230. Actuating the display module 200 from the retracted configuration to the deployed configuration may at least partially expose or reveal the panel mount 230 of the display module 200. In some embodiments, the display panel 170 is a curved Samsung 43" monitor or television that extends within or adjacent the panel mount 230. In addition, or instead, any other brand, model, and/or size of monitor or television may be used in the panel mount 230 as the display panel 170 (or a portion thereof). Actuating the display module 200 from the retracted configuration to the deployed configuration may at least partially expose or reveal the upper merchandising compartment 225 of the upper merchandising module 195. When the display module 200 is in the deployed configuration, the display module 200 may be configured to articulate the display panel 170 in opposing directions 235 and 240 using the panel actuator 175 (or another powered actuator). In some embodiments, the display module 200 includes at least a portion of the lighting 180 (shown in FIG. 1A) (e.g., integrated RGB multi-colored LED light strips); said portion of the lighting 180 may be controlled by the automatic switch 165, a blue-tooth mobile application, a separate controller, or any combination thereof.

As shown in FIG. 2C, the rear display assembly 110 includes side merchandising modules 245 and 250 coupled to opposing sides (i.e., on the driver's side and the passenger's side of the vehicle 105) of the lower merchandising module 190 and/or the upper merchandising module 195. The side merchandising modules 245 and 250 may be used to demonstrate and display tablet computers. In addition, or instead, the side merchandising modules 245 and 250 may be used to demonstrate and display mobile phones. The side merchandising modules 245 and 250 are each actuable between a deployed configuration and a retracted configuration. The side merchandising modules 245 and 250 are each pivotably coupled to the lower merchandising module 190 and/or the upper merchandising module 195. In addition, or instead, the side merchandising modules 245 and 250 may each be slidably coupled to the lower merchandising module 190 and/or the upper merchandising module 195. In FIG. 2C, the side merchandising module 245 is shown in the retracted configuration, in which the side merchandising module 245 is not extended outwardly from a side surface of the lower merchandising module 190 and/or the upper merchandising module 195 but is instead stowed for transit. Conversely, in FIG. 2C, the side merchandising module 250 is shown in the deployed configuration, in which the side merchandising module 250 is extended outwardly from the side surface of the lower merchandising module 190 and/or the upper merchandising module 195.

In operation, the base 185 is "legless" so that, when the rear display assembly 110 is deployed, as shown in FIG. 2A, the base 185 is extended from the rear portion 120b of the vehicle 105 to support the lower merchandising module 190, the upper merchandising module 195, and the display module 200 without the need for support "legs" extending to the ground. In this position, the rear display assembly 110 is usable to demonstrate and display mobile phones, mobile phone accessories, tablet computers, tablet computer accessories, other mobile devices, other mobile device accessories, or any combination thereof. In some embodiments, before the rear display assembly 110 is stowed, the mobile devices and mobile device accessories demonstrated and displayed using the rear display assembly 110 are removed from the rear display assembly 110 and placed in the safekeeping assembly 116, as will be described in further detail below.

Figure 2D:
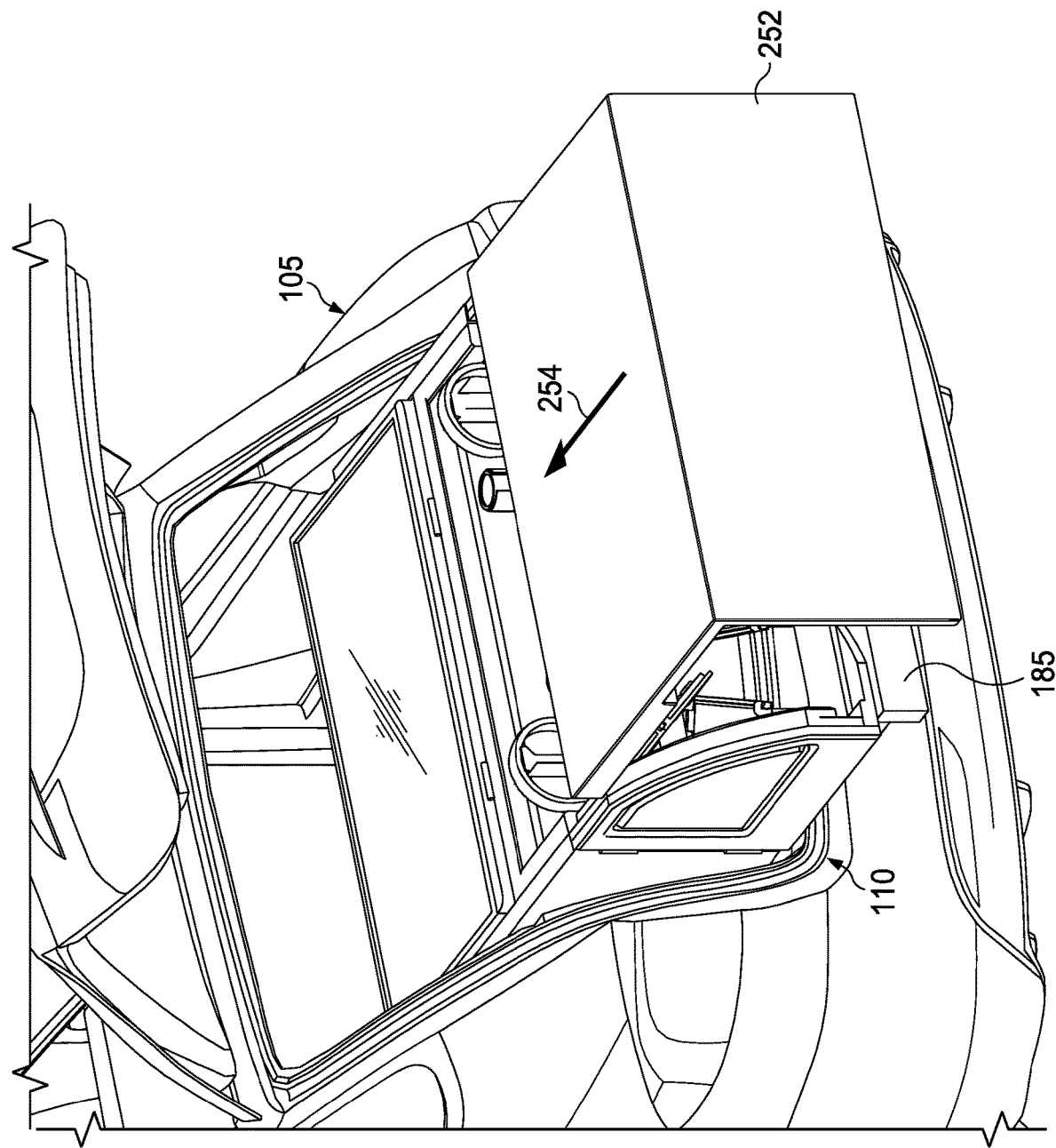
FIG. 2D is a rear perspective view of the rear display assembly of FIG. 2A in a third partially-retracted state or configuration, according to one or more embodiments of the present disclosure.
Figure 2E:
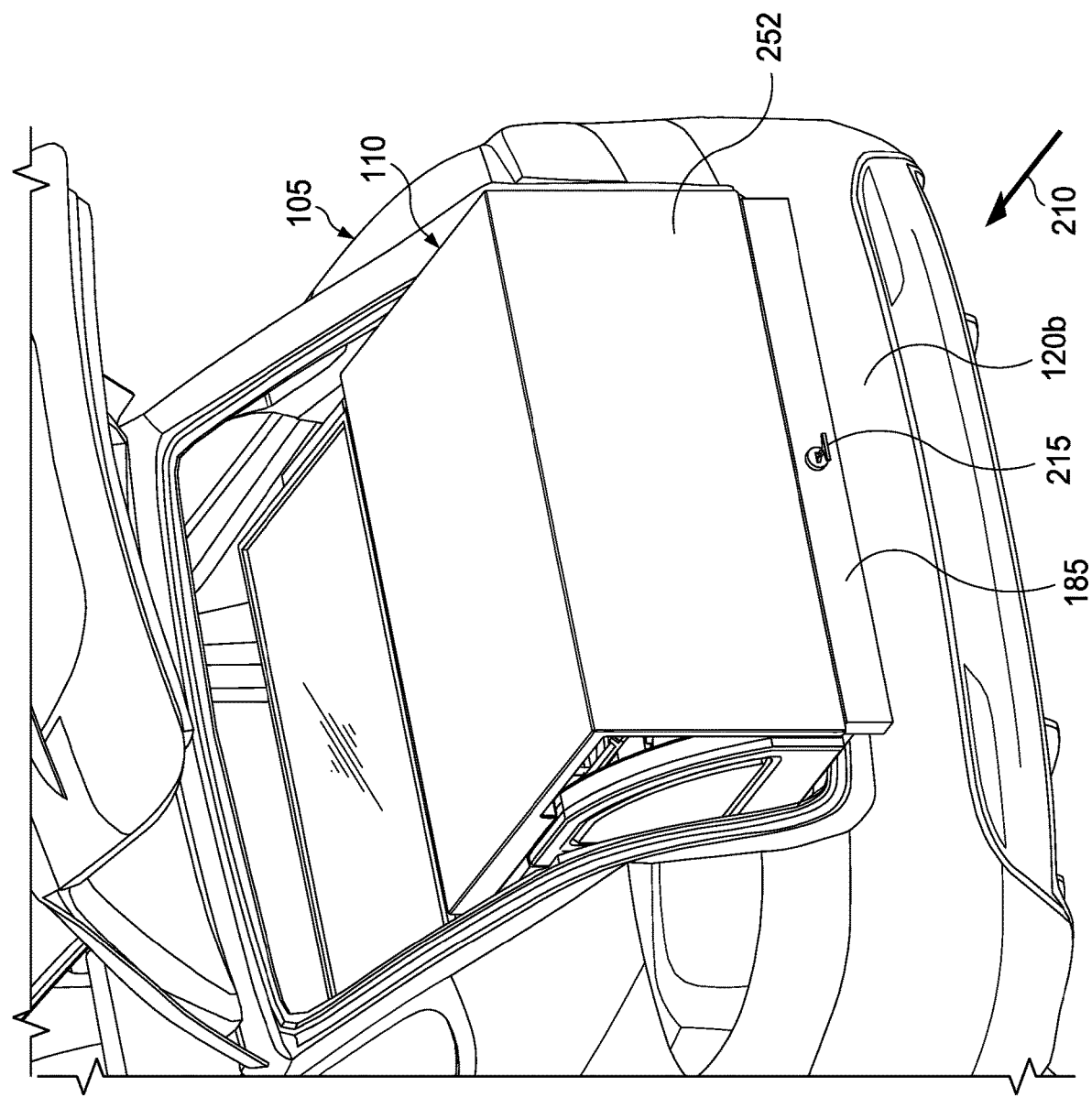
FIG. 2E is a rear perspective view of the rear display assembly of FIG. 2A in a fourth partially-retracted state or configuration, according to one or more embodiments of the present disclosure.
Figure 2F:
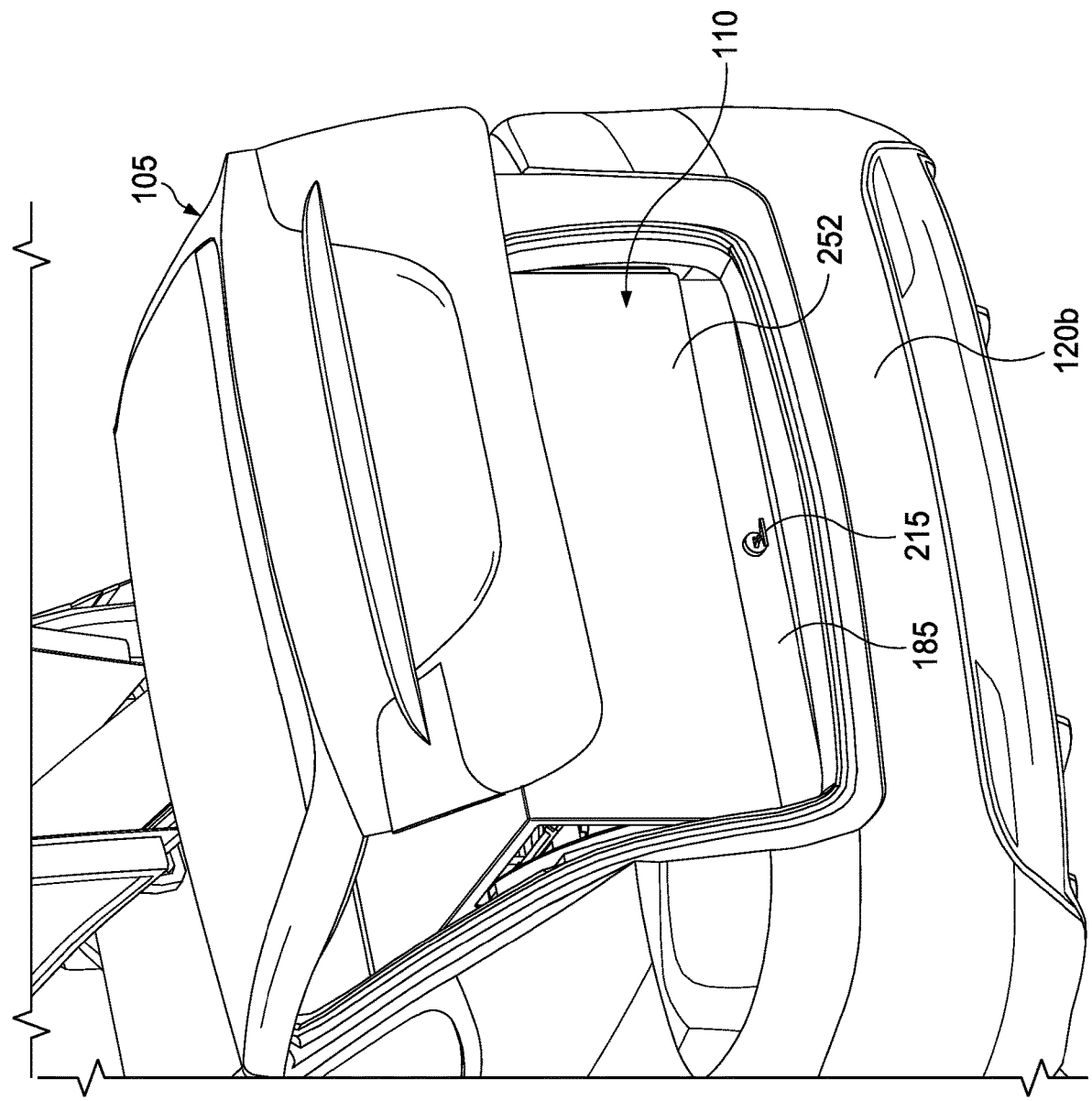
FIG. 2F is a rear perspective view of the rear display assembly of FIG. 2A in a fully-retracted state or configuration, according to one or more embodiments of the present disclosure.

To stow the rear display assembly 110: the display module 200 is actuated from the deployed configuration to the retracted configuration, as shown in FIG. 2B; the side merchandising module 245 is actuated from the deployed configuration to the retracted configuration, as shown in FIG. 2C; the side merchandising module 250 is actuated from the deployed configuration to the retracted configuration; a cover 252 is installed over at least a portion of the rear display assembly 110, as indicated by arrow 254 in FIG. 2D; the base 185 is unlocked using the latching device 215; the base 185 is moved or slid in the direction 210 relative to the vehicle 105, as shown in FIG. 2E; the base 185 is locked in a retracted configuration, as shown in FIG. 2F, using the latching device 215; and a door of the main rear storage compartment at the rear portion 120b of the vehicle 105 is closed. Subsequently, this process may be performed in reverse to deploy the rear display assembly 110 and therefore will not be described in further detail.

Figure 3B:
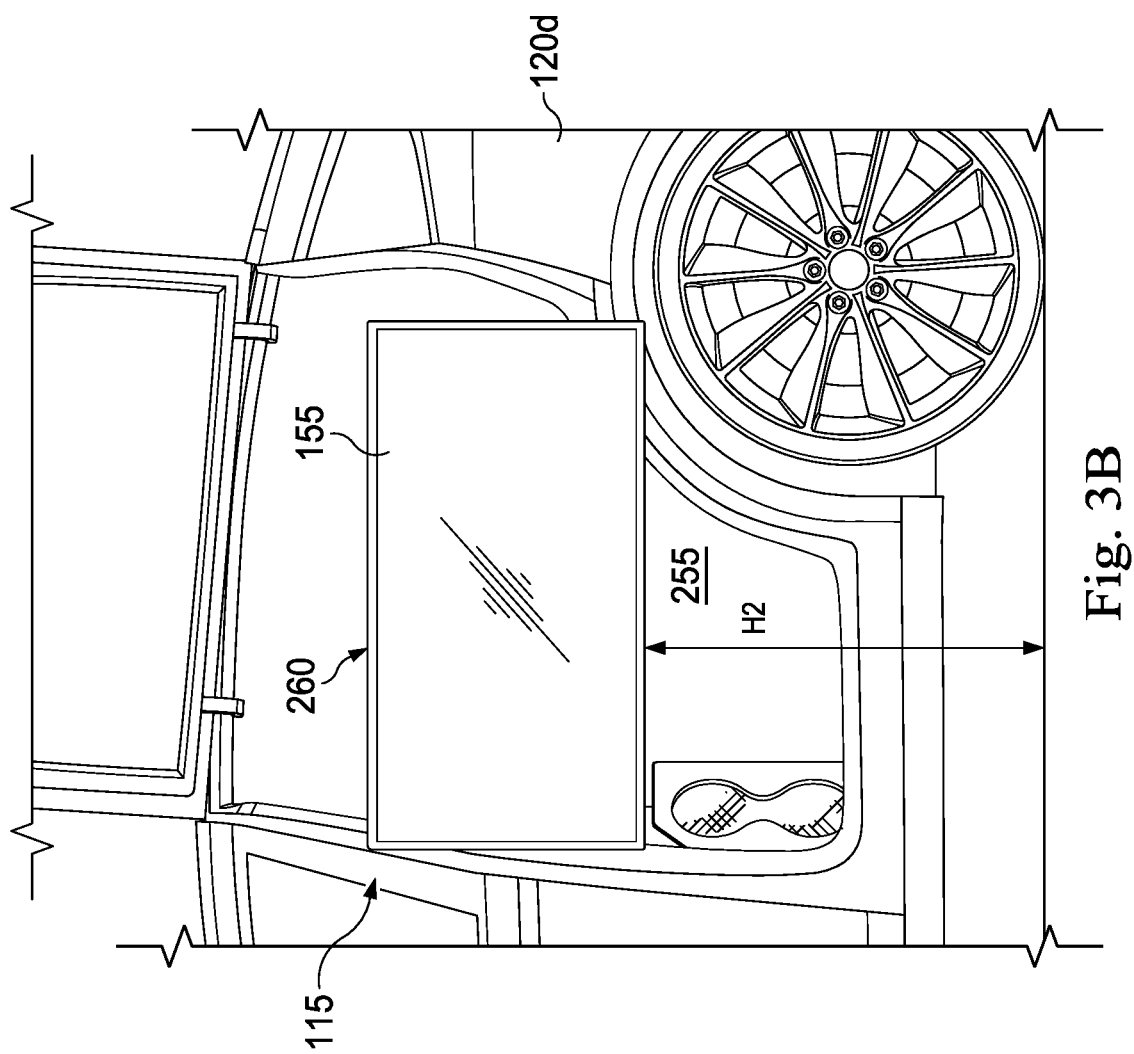
FIG. 3B is a side elevational view of the center display assembly of FIG. 3A in a second deployed state or configuration, according to one or more embodiments of the present disclosure.

In an embodiment, as illustrated in FIG. 3A, the center display assembly 115 includes a base 255 and a driver's side display module 260. The driver's side display module 260 includes the display panel 155. The vertical actuator 150 (shown in FIG. 1A) is actuable to move the driver's side display module 260 to a raised configuration, in which the display panel 155 is spaced apart from a ground surface by a height H1, as shown in FIG. 3A. The vertical actuator 150 (shown in FIG. 1A) is also actuable to move the driver's side display module 260 to a lowered configuration, in which the display panel 155 is spaced apart from the ground surface by a height H2, as shown in FIG. 3B. The height H2 is less than the height H1. In addition, the display panel 155 is rotatable between a landscape orientation (shown in FIG. 3B) and a portrait orientation (shown in FIG. 3C), as indicated by arrow 265 in FIG. 3C.

Figure 3C:
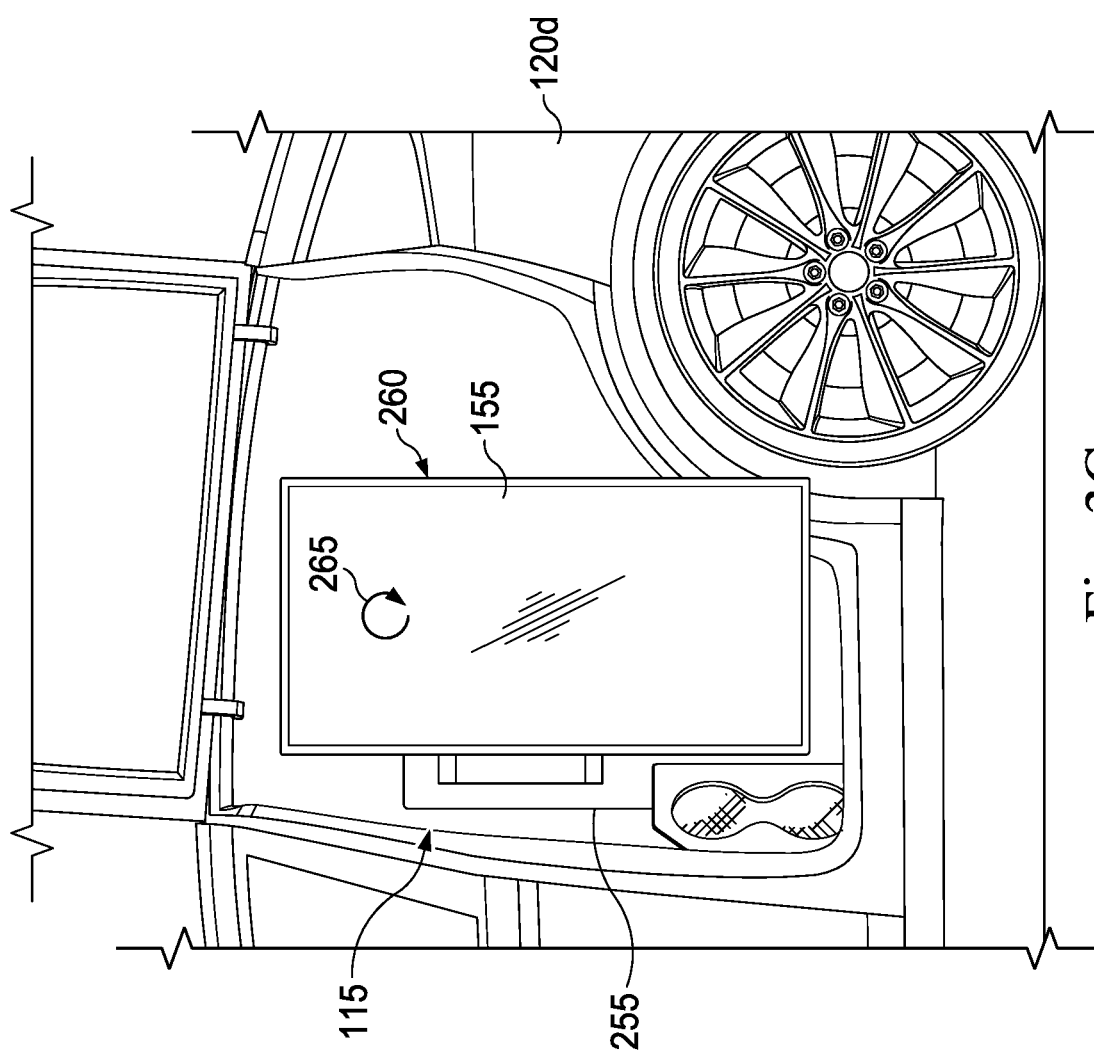
FIG. 3C is a side elevational view of the center display assembly of FIG. 3A in a third deployed state or configuration, according to one or more embodiments of the present disclosure.
Figure 3D:
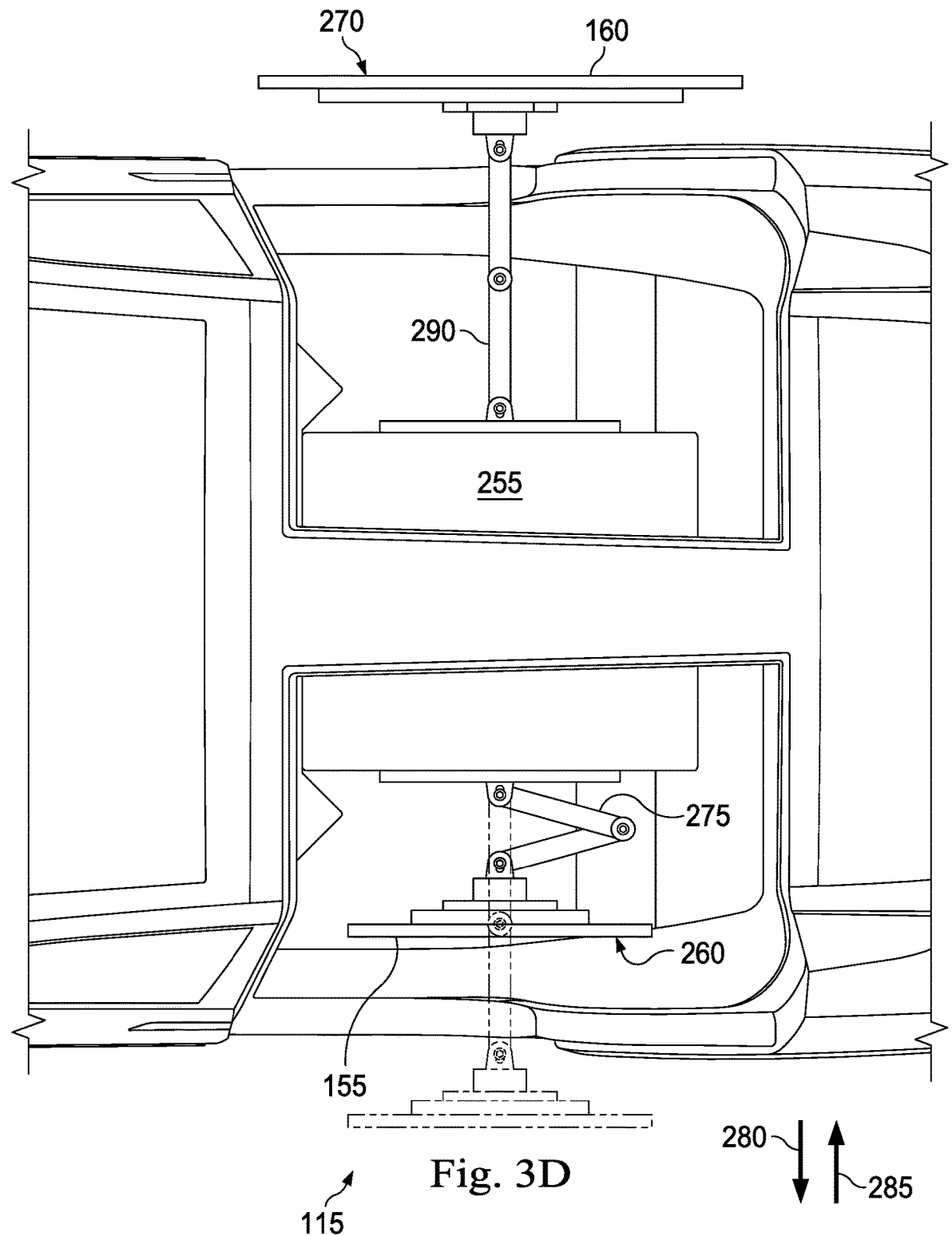
FIG. 3D is a top plan view of the center display assembly of FIG. 3C in a partially-retracted state or configuration, according to one or more embodiments of the present disclosure.

In FIG. 3D, the right rear door of the right side portion 120c of the vehicle 105 and the left rear door of the left side portion 120d of the vehicle 105 are omitted from view to more clearly illustrate the center display assembly 115, which includes the base 255, the driver's side display module 260, and a passenger's side display module 270. The display panel 155 of the driver's side display module 260 is coupled to the base 255 by an articulating arm 275. The articulating arm 275 is actuable to move the display panel 155 in opposing directions 280 and 285 between a deployed configuration, in which the display panel 155 extends outside the vehicle 105 (as shown in FIGS. 3A-3C), and a retracted configuration, in which the display panel 155 extends inside the vehicle 105 (as shown in FIG. 3D-3F).

The passenger's side display module 270 includes the display panel 160 (also shown in FIG. 1A). In various embodiments, the display panels 155 and/or 160 are 32" Samsung television monitors or televisions; in addition, or instead, any other brand, model, and/or size of monitor or television may be used as part of the center display assembly 115. The display panel 160 of the passenger's side display module 270 is coupled to the base 255 by an articulating arm 290. The articulating arm 290 is actuable to move the display panel 160 in the opposing directions 280 and 285 between a deployed configuration, in which the display panel 160 extends outside the vehicle 105 (as shown in FIG. 3D), and a retracted configuration, in which the display panel 160 extends inside the vehicle 105. Similarly to the driver's side display module 260, the vertical actuator 150 (shown in FIG. 1A) is actuable to move the passenger's side display module 270 between a raised configuration and a lowered configuration. Moreover, similarly to the display panel 155 of the driver's side display module 260, the display panel 160 of the passenger's side display module 270 is rotatable between a landscape orientation and a portrait orientation.

Figure 3F:
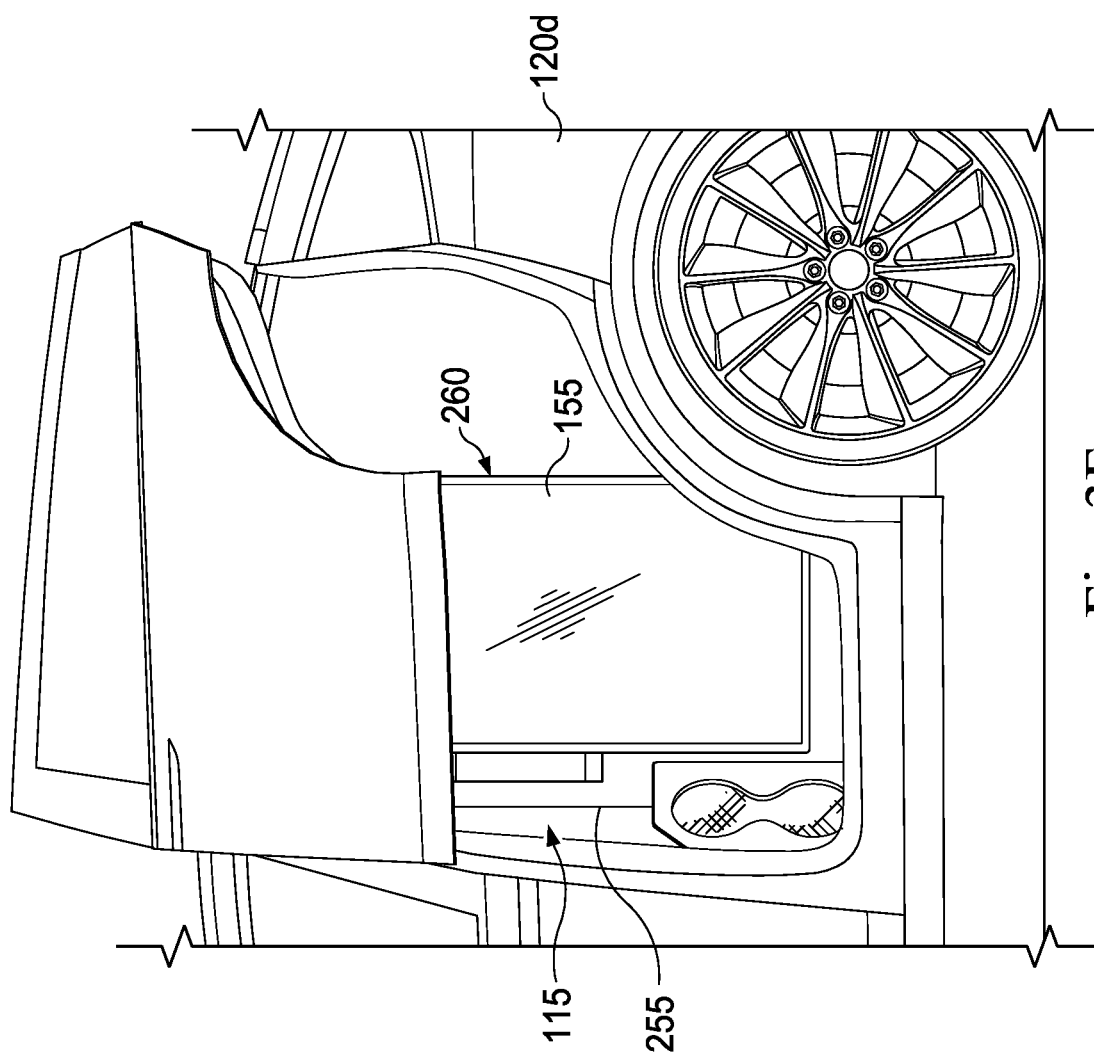
FIG. 3F is a side elevational view of the center display assembly of FIG. 3A in a fully-retracted state or configuration, according to one or more embodiments of the present disclosure.

In operation, to stow the center display assembly 115: the vertical actuator 150 (shown in FIG. 1A) is actuated to move the driver's side display module 260 and the passenger's side display module 270 to the lowered configuration, as shown in FIG. 3B; the display panel 155 is rotated to the portrait orientation, as indicated by the arrow 265 in FIG. 3C; the articulating arm 275 is actuated to move the display panel 155 in the direction 285 to the retracted configuration, as shown in FIGS. 3D and 3E; the left rear door of on the left side portion 120d of the vehicle 105 is closed, as shown in FIG. 3F; the display panel 160 is rotated to the portrait orientation; the articulating arm 290 is actuated to move the display panel 160 in the direction 280 to the retracted configuration; and the right rear door of on the right side portion 120c of the vehicle 105 is closed. Subsequently, this process may be performed in reverse to deploy the center display assembly 115 and therefore will not be described in further detail.

Figure 4A:
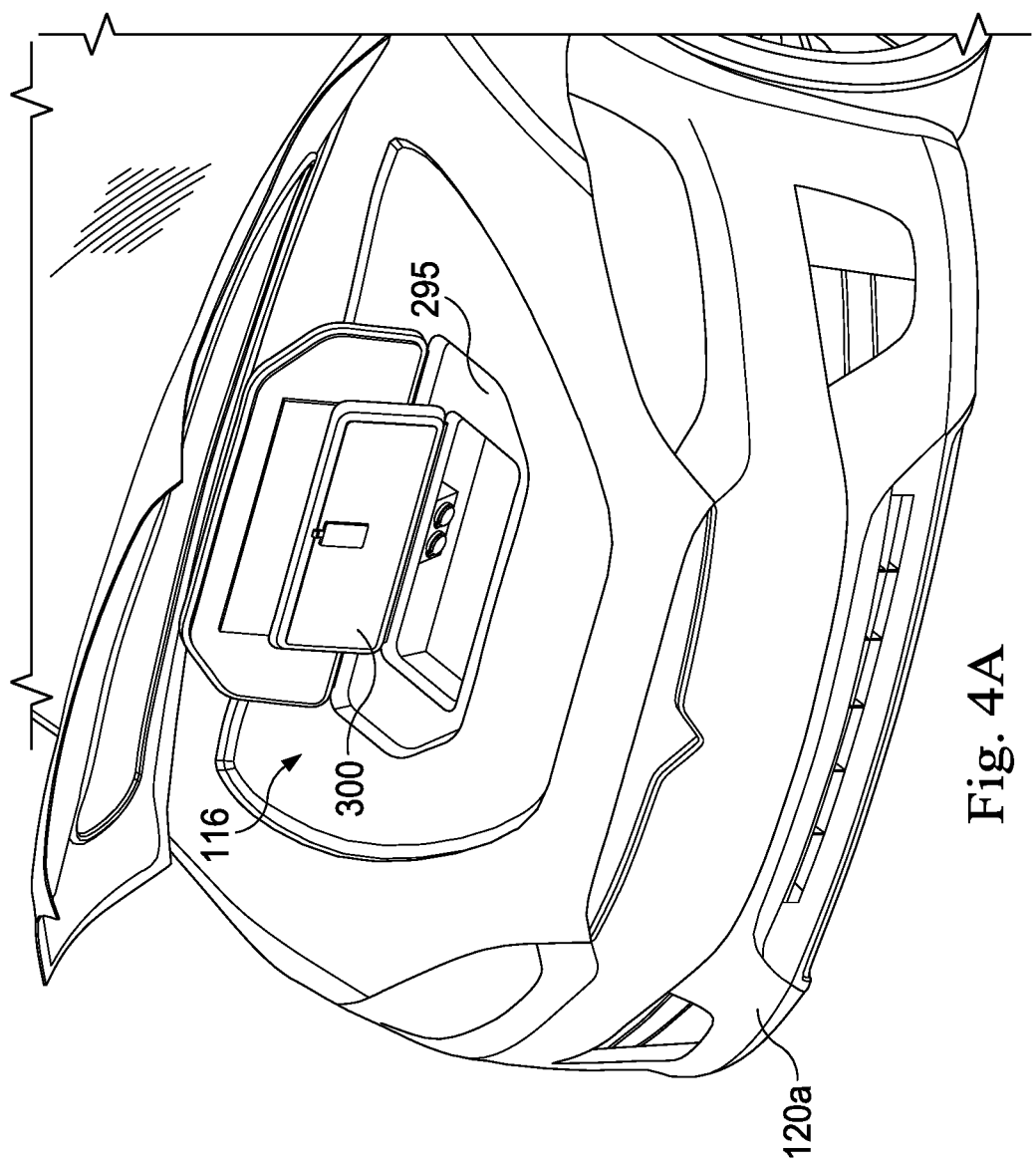
FIG. 4A is a front perspective view of a front portion of the mobile showroom of FIG. 1A in an open state or configuration, according to one or more embodiments of the present disclosure.
Figure 4B:
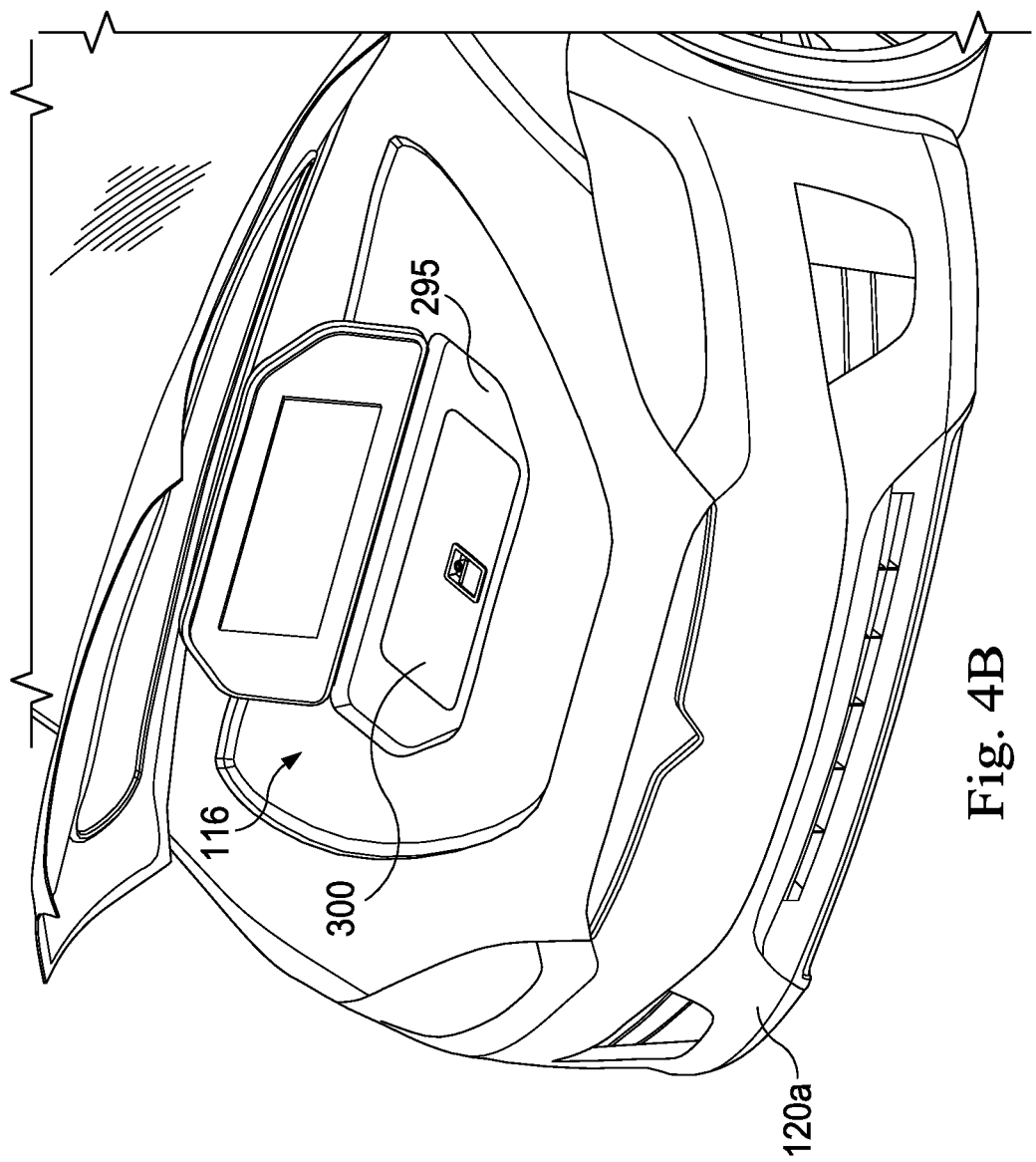
FIG. 4B is a front perspective view of the front portion of the mobile showroom of FIG. 4A in a partially-closed state or configuration, according to one or more embodiments of the present disclosure.

In an embodiment, as illustrated in FIG. 4A, the safekeeping assembly 116 includes a strongbox 295. The strongbox 295 includes a locking door 300 that can be used to restrict access to the inside of the strongbox 295 even when the hood of the vehicle 105 is open, as shown in FIG. 4B. As described above, in some embodiments, before the rear display assembly 110 is stowed, the mobile devices and mobile device accessories demonstrated and displayed using the rear display assembly 110 are removed from the rear display assembly 110 and placed in the safekeeping assembly 116. More particularly, the mobile devices and/or mobile device accessories are locked in the strongbox 295 using the locking door 300 to restrict access to said devices and/or accessories. As a result, the safekeeping assembly 116 decreases the likelihood of theft of the mobile devices and/or mobile device accessories when the mobile showroom 100 is not in use.

The various mobile showroom 100 embodiments disclosed herein each include components usable to demonstrate and display mobile phones and/or tablet computers; any component described herein as being usable to demonstrate and display mobile phones is equally usable to demonstrate and display tablet computers, and/or vice versa.

In some embodiments, the rear display assembly 110 is operably coupled to the power source 140 (shown in FIG. 1A) (or another power source) so that: when the rear display assembly 110 is moved or slid in the direction 205, the power source 140 (or the another power source) automatically provides power via the automatic switch 165 to the mobile phone(s) and/or tablet computer(s) positioned in the lower merchandising compartment 220; when the rear display assembly 110 is moved or slid in the direction 205, the power source 140 (or the another power source) automatically provides power to the mobile phone(s) and/or tablet computer(s) positioned in the upper merchandising compartment 225; and/or when the tablet mounts 245 and/or 250 is/are extended outwardly from a side surface of the lower merchandising module 190 and/or the upper merchandising module 195, the power source 140 (or the another power source) automatically provides power to the mobile phone(s) and/or tablet computer(s) positioned on the tablet mounts 245 and/or 250. The power source 140 (or another power source) is similarly coupled to the center display assembly 115 to provide power via the manual switch 145, the automatic switch 165, a blue-tooth mobile application, a separate controller, or any combination thereof to the display panels 155 and 160 of the center display assembly 115.

In those embodiments in which the lower merchandising module 190 includes at least a portion of the lighting 180 (shown in FIG. 1A) (e.g., integrated RGB multi-colored LED light strips), the power source 140 (or the another power source) may automatically provide power via the automatic switch 165 to said portion of the lighting 180 when the rear display assembly 110 is moved or slid in the direction 205. In those embodiments in which the upper merchandising module 195 includes at least a portion of the lighting 180 (shown in FIG. 1A) (e.g., integrated RGB multi-colored LED light strips), the power source 140 (or the another power source) may automatically provide power via the automatic switch 165 to said portion of the lighting 180 when the rear display assembly 110 is moved or slid in the direction 205. In those embodiments in which the display module 200 includes at least a portion of the lighting 180 (shown in FIG. 1A) (e.g., integrated RGB multi-colored LED light strips), the power source 140 (or the another power source) may automatically provide power via the automatic switch 165 to said portion of the lighting 180 when the rear display assembly 110 is moved or slid in the direction 205. The center section may similarly include at least a portion of the lighting 180 controlled by the manual switch 145, the automatic switch 165, a blue-tooth mobile application, a separate controller, or any combination thereof and to which the power source 140 (or the another power source) may be coupled to provide power thereto (automatically or otherwise).

In some embodiments, the power source 140 and/or the another power source is/are separate from the power source 125 of the vehicle 105. In some embodiments, the center display assembly 115 houses the power source 140 (and/or the another power source). In such embodiments, the center display assembly 115 may include an access hatch allowing access to the power source 140 (and/or the another power source) and various other electronic components when needed. In some embodiments, a plug (e.g., a stainless steel shore plug) is installed beneath the vehicle 105 (or elsewhere) to provide easy access for charging of the power source 140 (and/or the another power source).

In several example embodiments, instead of, or in addition to, operating as a mobile showroom 100 to demonstrate and display devices such as, for example, mobile phones or tablet computers, the mobile showroom 100 described above, and/or illustrated in whole or in part in FIGS. 1A-4B, may operate as a service vehicle for a technician. In this regard, in several embodiments, a technician may drive the mobile showroom 100 to a customer location to install a device, such as a flat-screen television, on behalf of the customer; the technician may store installation tools, devices such as the to-be-installed flat-screen television, and other equipment in the mobile showroom 100. In other embodiments, the technician may drive the mobile showroom 100 to a customer location to service or repair a device, such as a flat-screen television; the technician may store tools, diagnostic equipment, other equipment, or any combination thereof, within the mobile showroom 100. In several embodiments, one or more of the steps of installing a device, or repairing a device, may be executed or carried out in whole or in part using the mobile showroom 100. For example, installation or repair work may be carried out using the work tray to support tools, or to support the device that is being installed or repaired, or to support other equipment, etc.

Figure 5:
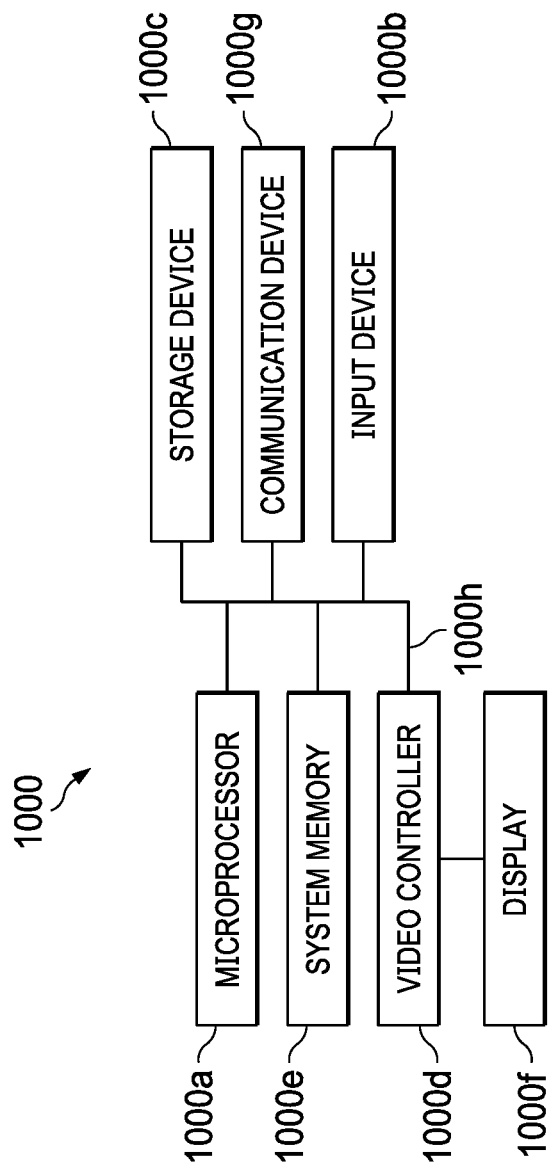
FIG. 5 is a diagrammatic illustration of a computing node for implementing one or more embodiments of the present disclosure.

Referring to FIG. 5, with continuing reference to FIGS. 1A-5, in one or more embodiments, a computing node 1000 for implementing one or more embodiments of one or more of the above-described elements, systems (e.g., the system 100), assemblies (e.g., the assemblies 110, 115, and/or 116), apparatus, methods, and/or steps, or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, systems (e.g., the system 100), assemblies (e.g., the assemblies 110, 115, and/or 116) apparatus, methods, and/or steps, or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

Attached hereto is an Appendix that includes Figures A through G. Specifically, in several embodiments, one or more of the embodiments of the present application are provided in whole or in part as described and illustrated in the Appendix, which forms part of the present application. Moreover, Figures A through G provide additional support for any U.S. or non-U.S. design applications that are to be filed in the future claiming priority to this present U.S. utility patent application. More particularly, in the Appendix:

Figure A is a perspective view of a new, original design for a vehicle system such as, for example, a mobile showroom;

Figure B is a rear elevational view thereof;

Figure C is a front elevational view thereof;

Figure D is a left side elevational view thereof;

Figure E is a right side elevational view thereof;

Figure F is a top plan view thereof; and

Figure G is another perspective view thereof.

In several embodiments, one or more of the embodiments described and illustrated in the Appendix are combined in whole or in part with one or more of the embodiments described above, illustrated in one or more of FIGS. 1A through 4B, one or more other embodiments described and illustrated in the Appendix, or any combination thereof.

A first system has been disclosed. The first system generally includes a vehicle, including: a main rear storage compartment; and a main center cabin located in front of the main rear storage compartment; a rear display assembly extending within the main rear storage compartment, the rear display assembly including: a first base movable in opposing directions between retracted and deployed configurations; and a first merchandising module supported by the first base and usable when the first base is in the deployed configuration to demonstrate and/or display a first device; and a center display assembly extending within the main center cabin, the center display assembly including: a second base; and a first display module supported by the second base.

The foregoing system embodiment may include one or more of the following elements, either alone or in combination with one another:

The system further includes a first power source operable to provide power to the first device and/or the first display module; wherein the vehicle further includes a motor, a second power source operable to provide power to the motor, and a drive system coupled to the motor; and wherein the second power source is separate from the first power source.

The system further includes a first switch automatically operable when the first base is moved towards the deployed configuration to provide power from the first power source to the first device and/or the first display module.

The rear display assembly further includes a second merchandising module supported by the first base and usable when the first base is in the deployed configuration to demonstrate and/or display a second device.

The first device is a first mobile device and/or a first mobile device accessory; and wherein the second device is a second mobile device and/or a second mobile device accessory.

The first display module includes a display panel.

The first display module further includes an articulating arm articulable to move the display panel between retracted and deployed configurations; wherein, in the retracted configuration of the display panel, the display panel extends inside the vehicle; and wherein, in the deployed configuration of the display panel, the display panel extends outside the vehicle.

The system further includes a safekeeping assembly, the safekeeping assembly including: a strongbox usable to contain the first device; and a locking door lockable to secure the first device in the strongbox.

A second system has also been disclosed. The second system generally includes a vehicle, including: a motor; a first power source operable to provide power to the motor; a drive system coupled to the motor; and a main rear storage compartment; a rear display assembly extending within the main rear storage compartment, the rear display assembly including: a base movable in opposing directions between retracted and deployed configurations; and a first merchandising module supported by the base and usable when the base is in the deployed configuration to demonstrate and/or display a first device; and a second power source operable to provide power to the first device; wherein the second power source is separate from the first power source.

The foregoing system embodiment may include one or more of the following elements, either alone or in combination with one another:

The system further includes a switch automatically operable when the base is moved towards the deployed configuration to provide power from the second power source to the first device.

The base is legless so that, when the base is in the deployed configuration, the base supports the first merchandising module without a need for support legs.

The rear display assembly further includes a second merchandising module supported by the base and usable when the base is in the deployed configuration to demonstrate and/or display a second device; wherein the first device is a first mobile device and/or a first mobile device accessory; and wherein the second device is a second mobile device and/or a second mobile device accessory.

The rear display assembly further includes a side merchandising module pivotably and/or slidably coupled to the first merchandising module and usable to demonstrate and/or display a second device; the first device is a first mobile device and/or a first mobile device accessory; and the second device is a second mobile device and/or a second mobile device accessory.

The system further includes a display module supported by the base; wherein the display module includes: a display panel; a panel mount to which the display panel is mounted; and a panel actuator actuable to move the panel mount between retracted and deployed configurations.

In the retracted configuration of the panel mount, the display panel extends in a generally horizontal orientation; and, in the deployed configuration of the panel mount, the display panel extends in a generally vertical orientation.

A third system has also been disclosed. The third system generally includes: a vehicle, including: a motor; a first power source operable to provide power to the motor; a drive system coupled to the motor; a main rear storage compartment; and a main center cabin located in front of the main rear storage compartment; a center display assembly extending within the main center cabin, the center display assembly including: a base; and a display module supported by the base; and a second power source operable to provide power to the display module; wherein the second power source is separate from the first power source.

The foregoing system embodiment may include one or more of the following elements, either alone or in combination with one another:

The system further includes a switch manually operable to provide power from the first power source to the display module.

The display module includes a display panel.

The display module further includes a first articulating arm articulable to move the display panel between retracted and deployed configurations; wherein, in the retracted configuration of the display panel, the display panel extends inside the vehicle; and wherein, in the deployed configuration of the display panel, the display panel extends outside the vehicle.

The center display assembly further includes a vertical actuator actuable to move the display module between raised and lowered configurations; wherein, in the raised configuration of the display module, the display panel is spaced apart from a ground surface by a first height; and wherein, in the lowered configuration of the display module, the display panel is spaced apart from the ground surface by a second height, which is less than the first height.

A fourth system has also been disclosed. The fourth system generally includes: a vehicle defining a main rear storage compartment and a main center cabin located in front of the main rear storage compartment; a rear display assembly extending within the main rear storage compartment, the rear display assembly including: a first base movable in opposing directions between retracted and deployed configurations; and a first merchandising module supported by the first base and usable when the first base is in the deployed configuration to demonstrate and/or display a first device; and a center display assembly extending within the main center cabin, the center display assembly including: a second base; and a first display module supported by the second base.

The foregoing system embodiment may include one or more of the following elements, either alone or in combination with one another:

The system further includes: a first power source operable to provide electrical power to the first device and/or the first display module; and a second power source operable to provide electrical power to the vehicle; wherein the second power source is separate from the first power source.

The system further includes: a power source operable to provide electrical power to the first device and/or the first display module; and a switch; wherein the switch is automatically operable when the first base is in the retracted configuration to prevent the power source from providing electrical power to the first device and/or the first display module; and wherein the switch is automatically operable when the first base is moved towards the deployed configuration to permit the power source to provide electrical power to the first device and/or the first display module.

The rear display assembly further includes a second merchandising module supported by the first base and usable when the first base is in the deployed configuration to demonstrate and/or display a second device.

The first device is a first mobile device and/or a first mobile device accessory; and wherein the second device is a second mobile device and/or a second mobile device accessory.

The first display module includes a display panel movable between retracted and deployed configurations; and wherein, in the deployed configuration of the display panel, the display panel extends outside the vehicle.

The first display module further includes an articulating arm articulable to move the display panel between the retracted and deployed configurations; wherein, in the retracted configuration of the display panel, the display panel extends inside the vehicle.

The system further includes a safekeeping assembly, the safekeeping assembly including: a strongbox usable to contain the first device; and a locking door lockable to secure the first device in the strongbox.

A fifth system has also been disclosed. The fifth system generally includes: a vehicle defining a main rear storage compartment; a rear display assembly extending within the main rear storage compartment, the rear display assembly including: a base movable in opposing directions between retracted and deployed configurations; and a first merchandising module supported by the base and usable when the base is in the deployed configuration to demonstrate and/or display a first device; and a first power source operable to provide electrical power to the first device; wherein the base is legless so that, when the base is in the deployed configuration, the base supports the first merchandising module without a need for support legs.

The foregoing system embodiment may include one or more of the following elements, either alone or in combination with one another:

The system further includes a second power source operable to provide electrical power to the vehicle; wherein the second power source is separate from the first power source.
  The system further includes a switch; wherein the switch is automatically operable when the base is in the retracted configuration to prevent the second power source from providing electrical power to the first device; and wherein the switch is automatically operable when the base is moved towards the deployed configuration to permit the second power source to provide electrical power to the first device.
  The rear display assembly further includes a second merchandising module supported by the base and usable when the base is in the deployed configuration to demonstrate and/or display a second device; wherein the first device is a first mobile device and/or a first mobile device accessory; and wherein the second device is a second mobile device and/or a second mobile device accessory.
  The rear display assembly further includes a side merchandising module pivotably and/or slidably coupled to the first merchandising module and usable to demonstrate and/or display a second device; wherein the first device is a first mobile device and/or a first mobile device accessory; and wherein the second device is a second mobile device and/or a second mobile device accessory.
  The system further includes a display module supported by the base; wherein the display module includes: a display panel; a panel mount to which the display panel is mounted; and a panel actuator actuable to move the panel mount between retracted and deployed configurations.
  In the retracted configuration of the panel mount, the display panel extends in a generally horizontal orientation; and wherein, in the deployed configuration of the panel mount, the display panel extends in a generally vertical orientation.

A sixth system has also been disclosed. The sixth system generally includes: a vehicle defining a main rear storage compartment and a main center cabin located in front of the main rear storage compartment; a center display assembly extending within the main center cabin, the center display assembly including: a base; and a display module supported by the base; and a first power source operable to provide electrical power to the display module; wherein the display module includes a display panel movable between retracted and deployed configurations; and wherein, in the deployed configuration of the display panel, the display panel extends outside the vehicle.

The foregoing system embodiment may include one or more of the following elements, either alone or in combination with one another:

The system further includes: a second power source operable to provide electrical power to the vehicle; and wherein the second power source is separate from the first power source.
  The system further includes a switch; wherein the switch is manually operable to prevent the first power source from providing electrical power to the display module; and wherein the switch is manually operable to permit the first power source to provide electrical power to the display module.
  The display module further includes an articulating arm articulable to move the display panel between the retracted and deployed configurations; and wherein, in the retracted configuration of the display panel, the display panel extends inside the vehicle.
  The center display assembly further includes a vertical actuator actuable to move the display module between raised and lowered configurations; wherein, in the raised configuration of the display module, the display panel is spaced apart from a ground surface by a first height; and wherein, in the lowered configuration of the display module, the display panel is spaced apart from the ground surface by a second height, which is less than the first height.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the embodiments disclosed above and in the Appendix, or variations thereof, may be combined in whole or in part with any one or more of the other embodiments disclosed above and in the Appendix, or variations thereof.

Although several embodiments have been described in detail above and in the Appendix, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A system, comprising:
a vehicle defining a main rear storage compartment and a main center cabin located in front of the main rear storage compartment;
a rear display assembly extending within the main rear storage compartment, the rear display assembly comprising:
a first base movable in opposing directions between retracted and deployed configurations; and
a first merchandising module supported by the first base and usable when the first base is in the deployed configuration to demonstrate and/or display a first device;
and
a center display assembly extending within the main center cabin, the center display assembly comprising:
a second base; and
a first display module supported by the second base.

2. The system of claim 1, further comprising:
a first power source operable to provide electrical power to the first device and/or the first display module; and
a second power source operable to provide electrical power to the vehicle;
wherein the second power source is separate from the first power source.

3. The system of claim 1, further comprising:
a power source operable to provide electrical power to the first device and/or the first display module; and
a switch;
wherein the switch is automatically operable when the first base is in the retracted configuration to prevent the power source from providing electrical power to the first device and/or the first display module; and
wherein the switch is automatically operable when the first base is moved towards the deployed configuration to permit the power source to provide electrical power to the first device and/or the first display module.

4. The system of claim 1, wherein the rear display assembly further comprises a second merchandising module supported by the first base and usable when the first base is in the deployed configuration to demonstrate and/or display a second device.

5. The system of claim 4, wherein the first device is a first mobile device and/or a first mobile device accessory; and
wherein the second device is a second mobile device and/or a second mobile device accessory.

6. The system of claim 1, wherein the first display module comprises a display panel movable between retracted and deployed configurations; and
wherein, in the deployed configuration of the display panel, the display panel extends outside the vehicle.

7. The system of claim 6, wherein the first display module further comprises an articulating arm articulable to move the display panel between the retracted and deployed configurations;
wherein, in the retracted configuration of the display panel, the display panel extends inside the vehicle.

8. The system of claim 1, further comprising a safekeeping assembly, the safekeeping assembly comprising:
a strongbox usable to contain the first device; and
a locking door lockable to secure the first device in the strongbox.

9. A system, comprising:
a vehicle defining a main rear storage compartment;
a rear display assembly extending within the main rear storage compartment, the rear display assembly comprising:
a base movable in opposing directions between retracted and deployed configurations; and
a first merchandising module supported by the base and usable when the base is in the deployed configuration to demonstrate and/or display a first device;
and
a first power source operable to provide electrical power to the first device;
wherein the base is legless so that, when the base is in the deployed configuration, the base supports the first merchandising module without a need for support legs.

10. The system of claim 9, further comprising a second power source operable to provide electrical power to the vehicle;
wherein the second power source is separate from the first power source.

11. The system of claim 9, further comprising a switch;
wherein the switch is automatically operable when the base is in the retracted configuration to prevent the second power source from providing electrical power to the first device; and
wherein the switch is automatically operable when the base is moved towards the deployed configuration to permit the second power source to provide electrical power to the first device.

12. The system of claim 9, wherein the rear display assembly further comprises a second merchandising module supported by the base and usable when the base is in the deployed configuration to demonstrate and/or display a second device;
wherein the first device is a first mobile device and/or a first mobile device accessory; and
wherein the second device is a second mobile device and/or a second mobile device accessory.

13. The system of claim 9, wherein the rear display assembly further comprises a side merchandising module pivotably and/or slidably coupled to the first merchandising module and usable to demonstrate and/or display a second device;
wherein the first device is a first mobile device and/or a first mobile device accessory; and
wherein the second device is a second mobile device and/or a second mobile device accessory.

14. The system of claim 9, further comprising a display module supported by the base;
wherein the display module comprises:
a display panel;
a panel mount to which the display panel is mounted; and
a panel actuator actuable to move the panel mount between retracted and deployed configurations.

15. The system of claim 14,
wherein, in the retracted configuration of the panel mount, the display panel extends in a generally horizontal orientation; and
wherein, in the deployed configuration of the panel mount, the display panel extends in a generally vertical orientation.

16. A system, comprising:
a vehicle defining a main rear storage compartment and a main center cabin located in front of the main rear storage compartment;
a center display assembly extending within the main center cabin, the center display assembly comprising:
a base; and
a display module supported by the base;
and
a first power source operable to provide electrical power to the display module;
wherein the display module comprises a display panel movable between retracted and deployed configurations; and
wherein, in the deployed configuration of the display panel, the display panel extends outside the vehicle.

17. The system of claim 16, further comprising:
a second power source operable to provide electrical power to the vehicle; and
wherein the second power source is separate from the first power source.

18. The system of claim 16, further comprising a switch;
wherein the switch is manually operable to prevent the first power source from providing electrical power to the display module; and
wherein the switch is manually operable to permit the first power source to provide electrical power to the display module.

19. The system of claim 18, wherein the display module further comprises an articulating arm articulable to move the display panel between the retracted and deployed configurations; and
wherein, in the retracted configuration of the display panel, the display panel extends inside the vehicle.

20. The system of claim 18, wherein the center display assembly further comprises a vertical actuator actuable to move the display module between raised and lowered configurations;
wherein, in the raised configuration of the display module, the display panel is spaced apart from a ground surface by a first height; and
wherein, in the lowered configuration of the display module, the display panel is spaced apart from the ground surface by a second height, which is less than the first height.

* * * * *